United States Patent
Hirata et al.

(10) Patent No.: US 9,551,946 B2
(45) Date of Patent: Jan. 24, 2017

(54) POLYCARBONATE COPOLYMER, COATING LIQUID USING SAME, MOLDED BODY, AND ELECTROPHOTOGRAPHIC PHOTOSENSITIVE BODY

(71) Applicant: IDEMITSU KOSAN CO., LTD., Tokyo (JP)

(72) Inventors: Kengo Hirata, Chiba (JP); Hironobu Morishita, Chiba (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 0 days.

(21) Appl. No.: 14/893,729

(22) PCT Filed: May 22, 2014

(86) PCT No.: PCT/JP2014/063585
§ 371 (c)(1),
(2) Date: Nov. 24, 2015

(87) PCT Pub. No.: WO2014/192633
PCT Pub. Date: Dec. 4, 2014

(65) Prior Publication Data
US 2016/0116854 A1  Apr. 28, 2016

(30) Foreign Application Priority Data

May 27, 2013 (JP) ................................ 2013-110871

(51) Int. Cl.
*C08G 64/10* (2006.01)
*C08G 64/14* (2006.01)
*C09D 169/00* (2006.01)
*G03G 5/05* (2006.01)
*G03G 5/07* (2006.01)
*C08G 64/06* (2006.01)

(52) U.S. Cl.
CPC ............. *G03G 5/075* (2013.01); *C08G 64/06* (2013.01); *C08G 64/10* (2013.01); *C08G 64/14* (2013.01); *C09D 169/00* (2013.01); *G03G 5/0564* (2013.01)

(58) Field of Classification Search
None
See application file for complete search history.

(56) References Cited

U.S. PATENT DOCUMENTS

| | | | | |
|---|---|---|---|---|
| 9,188,887 B2 * | 11/2015 | Hirata | ................... | C08G 63/64 |
| 2005/0106483 A1 * | 5/2005 | Shoshi | ................... | G03G 5/047 |
| | | | | 430/58.7 |
| 2008/0108777 A1 * | 5/2008 | Davis | ................... | C08G 63/64 |
| | | | | 528/196 |
| 2015/0147689 A1 | 5/2015 | Hirata et al. | | |

FOREIGN PATENT DOCUMENTS

| | | |
|---|---|---|
| JP | H4179961 A | 6/1992 |
| JP | H11172003 A | 6/1999 |
| JP | 3402936 B2 | 5/2003 |
| JP | 2005091952 * | 4/2005 |
| JP | 2005091952 A | 4/2005 |
| JP | 2005139339 A | 6/2005 |
| JP | 201126577 A | 2/2011 |
| JP | 2011026574 A | 2/2011 |
| JP | 201251983 A | 3/2012 |
| WO | WO-2012-115088 * | 8/2012 |

(Continued)

OTHER PUBLICATIONS

English Translation of International Preliminary Report on Patentability dated Dec. 1, 2015.

(Continued)

*Primary Examiner* — David Buttner
(74) *Attorney, Agent, or Firm* — Millen White Zelano & Branigan, P.C.

(57) ABSTRACT

A polycarbonate copolymer includes: a repeating unit represented by a formula (1) below; and a repeating unit represented by a formula (2) below, in which the repeating unit represented by the formula (1) is formed from a bischloroformate oligomer having an average number of monomer units n represented by a formula (100) below in a range from 0.1 to 1.3. In the formulae (100) and (1), $Ar^1$ represents a group represented by a formula (3) below. In the formula (2), $Ar^2$ represents a divalent aromatic group. In the formula (3) below, $X_1$ represents a single bond or an oxygen atom. $R_{11}$ each independently represents a methyl group or an ethyl group.

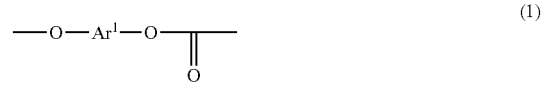

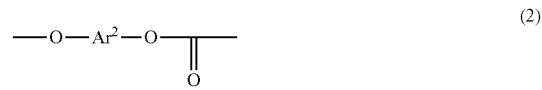

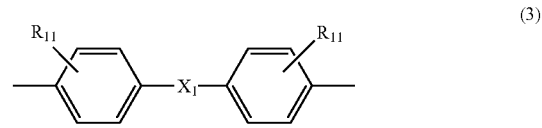

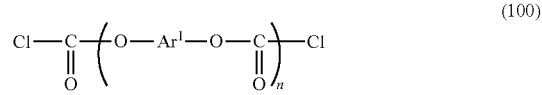

7 Claims, No Drawings

(56) References Cited

FOREIGN PATENT DOCUMENTS

WO    2013191174 A1    12/2013

OTHER PUBLICATIONS

International Search Report for PCT/JP2014/063585 dated Aug. 19, 2014.
English Abstract of JPH11172003, Publication Date: Jun. 29, 1999.
English Abstract of JPH04179961, Publication Date: Jun. 26, 1992.
English Abstract of JP2005091952, Publication Date: Apr. 7, 2005.
English Abstract of JP2011026574, Publication Date: Feb. 10, 2011.
English Abstract of JP2011026577, Publication Date: Feb. 10, 2011.
English Abstract of JP2005139339, Publication Date: Jun. 2, 2005.
English Abstract of JP-2012051983, Publication Date: Mar. 15, 2012.
English Abstract of JP3402936, Publication Date: May 6, 2003.

* cited by examiner

POLYCARBONATE COPOLYMER, COATING LIQUID USING SAME, MOLDED BODY, AND ELECTROPHOTOGRAPHIC PHOTOSENSITIVE BODY

TECHNICAL FIELD

The present invention relates to a polycarbonate polymer, a coating liquid using the polycarbonate polymer, a molding, and an electrophotographic photoreceptor.

BACKGROUND ART

A polycarbonate copolymer has been used as a material for moldings in various industrial fields because of its excellent mechanical characteristics, thermal characteristics and electrical characteristics. Recently, the polycarbonate copolymer has often been used in a field of a functional product requiring optical characteristics of the polycarbonate copolymer as well as the above characteristics. In accordance with such an expansion in application, the polycarbonate copolymer has been demanded to have a variety of performance. Not only a typically used polycarbonate copolymer but also polycarbonate copolymers having various chemical structures have been proposed.

The functional product is exemplified by an electrophotographic photoreceptor in which the polycarbonate copolymers are used as a binder resin for functional materials such as a charge generating material and a charge transporting material.

The electrophotographic photoreceptor has been demanded to have a predetermined sensitivity, electrical characteristics and optical characteristics in accordance with electrophotography process to be applied. A surface of a photosensitive layer of the electrophotographic photoreceptor is repeatedly subjected to operations such as corona electrification, toner development, transfer onto paper, cleaning and the like. Accordingly, electrical and mechanical external-forces are applied on the surface of the photosensitive layer every time such operations are performed. Consequently, the photosensitive layer provided on the surface of the electrophotographic photoreceptor is required to have durability against these external forces in order to maintain electrophotography image quality for a long period of time. Moreover, since the electrophotographic photoreceptor is typically manufactured by dissolving a functional material and a binder resin in an organic solvent and film-casting the obtained solvent on a conductive substrate and the like, the electrophotographic photoreceptor is required to have solubility in the organic solvent and stability of the obtained solvent.

Polycarbonate copolymers disclosed in Patent Literatures 1 to 3 have been known as polycarbonate copolymers satisfying the above properties.

Patent Literature 1 and Patent Literature 2 disclose a polycarbonate copolymer containing 1,1-bis(4-hydroxyphenyl) cyclohexane (bisphenol Z) and biphenol. Patent Literature 3 discloses a PC copolymer containing: 4,4'-dihydroxy-3,3'-dimethylbiphenyl; and 1,1-bis(3-methyl-4-hydroxyphenyl)cyclohexane or 2,2-bis(3-methyl-4-hydroxyphenyl)propane (bisphenol C).

As a high quality image has been increasingly used in recent years, an AC/DC superimposing electrification method in which an AC voltage is superimposed on a DC voltage is used as a method of electrifying a surface of a photosensitive layer of the electrophotographic photoreceptor. According to the AC/DC superimposing electrification method, stability of the electrophotographic photoreceptor is improved, whereas an electrical discharge amount of a surface of the electrophotographic photoreceptor is drastically increased since the AC voltage is superimposed. For this reason, a resin is deteriorated to increase wear volume of the electrophotographic photoreceptor. Accordingly, the electrophotographic photoreceptor has been required to have electrical strength in addition to the mechanical strength.

CITATION LIST

Patent Literatures

Patent Literature 1: JP-A-4-179961
Patent Literature 2: JP-A-2011-26577
Patent Literature 3: JP-A-2012-51983
Patent Literature 4: U.S. Pat. No. 3,402,936

SUMMARY OF THE INVENTION

Problems to be Solved by the Invention

In the polycarbonate copolymers disclosed in Patent Literatures 1 and 3, wear resistance is excellent but the electrical strength against the AC/DC superimposing electrification method is insufficient. In the polycarbonate copolymers, electrical discharge occurs at a contact nip between the electrophotographic photoreceptor and a charge roll to break intermolecular bonding, thereby causing electrification deterioration. As a result, the wear resistance of the polycarbonate copolymers is extremely reduced.

Accordingly, it has been proposed to use a polyarylate resin having an excellent electrical strength as disclosed in Patent Literature 4. An ester bonding of polyarylate is smaller than a carbonate bonding in terms of the dipole moment and is stronger than the carbonate bonding in terms of electrical energy. Accordingly, it is believed that the ester bonding of polyarylate is less likely to be broken than the carbonate bonding. However, since the mechanical strength of the polyarylate is not sufficient, a performance of the polyarylate is insufficient for a recent need for high durability. Moreover, the polyarylate resin is also inferior to the polycarbonate resin in a sensitivity in an electrophotography process and electrical properties. Thus, it is difficult to produce an electrophotographic photoreceptor having a mechanical strength, an excellent electrical strength, a favorable sensitivity in the electrophotography process and favorable electrical characteristics.

An object of the invention is to provide: a polycarbonate copolymer having excellent mechanical strength and electrical strength; and a coating liquid using the polycarbonate copolymer. Another object of the invention is to provide a molding and an electrophotographic photoreceptor using the polycarbonate copolymer or the coating liquid, the electrophotographic photoreceptor exhibiting an excellent wear resistance and an inhibited electrical deterioration.

Means for Solving the Problems

After dedicated study, the inventors have found that a polycarbonate copolymer having excellent mechanical strength and electrical strength can be obtained by a specific manufacturing method using as a main skeleton a skeleton of bisphenol substituted by a methyl group at an ortho position relative to an oxygen atom, and has reached the invention.

The inventors also have found that the polycarbonate copolymer having excellent mechanical strength and electrical strength against electric discharge (e.g., contact electrification) can be obtained by reducing chains of the main skeleton to improve solubility of the polycarbonate copolymer in an organic solvent and by limiting a corresponding skeleton in polymerization and limiting the polycarbonate copolymer to have a specific skeleton and a specific composition.

Further, the inventors have found that an electrophotographic photoreceptor having an excellent wear resistance, a high resistance to electric deterioration, a favorable sensitivity in the electrophotography process and favorable electrical characteristics can be obtained by using the polycarbonate copolymer in a surface layer and a photosensitive layer of the electrophotographic photoreceptor, and have reached the invention.

According to an aspect of the invention, a polycarbonate copolymer has a repeating unit represented by a formula (1) below and a repeating unit represented by a formula (2) below, in which the repeating unit represented by the formula (1) is formed from a bischloroformate oligomer having an average number of monomer units n represented by a formula (100) below in a range from 1.0 to 1.3.

[Formula 1]

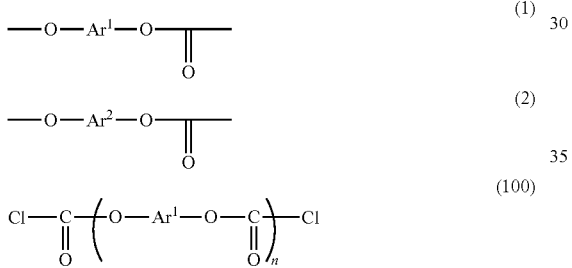

In the formulae (1) and (100), $Ar^1$ represents a group represented by a formula (3) below. In the formula (2), $Ar^2$ represents a divalent aromatic group.

[Formula 2]

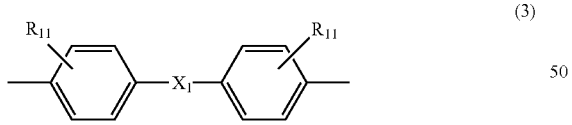

In the formula (3), $X_1$ represents a single bond or an oxygen atom. $R_{11}$ each independently represents a methyl group or an ethyl group.

According to another aspect of the invention, a coating liquid contains the above-described polycarbonate copolymer and an organic solvent.

According to still another aspect of the invention, a molding contains the above-described polycarbonate copolymer.

According to a further aspect of the invention, an electrophotographic photoreceptor includes a conductive substrate and a photosensitive layer provided on the conductive substrate, the photosensitive layer containing the above-described polycarbonate copolymer as a component.

According to the above aspect of the invention, a polycarbonate polymer having excellent mechanical strength and electrical strength against electric discharge (e.g., contact electrification) can be obtained. Moreover, according to the above aspect of the invention, an electrophotographic photoreceptor having an excellent wear resistance, a high resistance to electric deterioration, a favorable sensitivity in the electrophotography process and favorable electrical characteristics can be obtained by using the polycarbonate copolymer in a surface layer and a photosensitive layer of the electrophotographic photoreceptor.

DESCRIPTION OF EMBODIMENT(S)

A polycarbonate copolymer (hereinafter, also simply referred to as a "PC copolymer") according to an exemplary embodiment of the invention, a coating liquid using the PC copolymer, a molding, and an electrophotographic photoreceptor will be described in detail below.

Structure of PC Copolymer

The PC copolymer according to the exemplary embodiment has a repeating unit represented by a formula (1) below and a repeating unit represented by a formula (2) below, in which the repeating unit represented by the formula (1) is formed from a bischloroformate oligomer represented by a formula (100) below and having an average number of monomer units (n) in a range from 1.0 to 1.3.

[Formula 3]

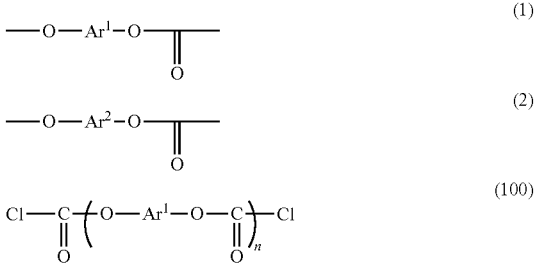

In the formulae (1) and (100), $Ar^1$ represents a group represented by a formula (3) below. In the formula (2), $Ar^2$ represents a divalent aromatic group.

[Formula 4]

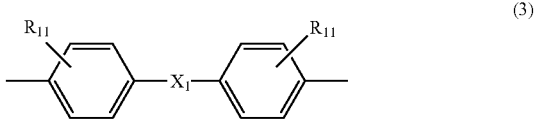

$X_1$ represents a single bond or an oxygen atom in the formula (3). $R_{11}$ each independently represents a methyl group or an ethyl group.

The PC copolymer according to the exemplary embodiment is manufactured from the bischloroformate oligomer represented by the formula (100) as a part of materials. The average number of monomer units (n) of the bischloroformate oligomer represented by the formula (100) is in a range from 1.0 to 1.3. By using the bischloroformate oligomer represented by the formula (100), even when the repeating unit represented by the formula (1) has a highly crystalline $Ar^1$ skeleton, a triad fraction of the $Ar^1$ skeleton in the PC copolymer can be reduced to 5 mol % or less. As a result, since crystallization of the PC copolymer can be inhibited, a PC copolymer having an excellent stability to a solution can be obtained. The triad fraction of the $Ar^1$ skeleton is more preferably 3 mol % or less, further preferably 1 mol % or less.

Herein, a triad and the triad fraction will be described.

Regarding chains of a monomer unit A and a monomer unit B, three monomer units in a row are defined as the triad. A percentage of a molar number of each of the triads to a total molar number of all the triads is defined as the triad fraction.

For instance, totally eight triads, which are represented by AAA, AAB, BBA, BAB, ABB and BBB as well as framed ABA and BAA, are present in the following chain of the monomer units A and B. In this chain, the number of moles of each triad in the total number of moles of all the eight triads, which is represented by a percentage, is defined as the triad fraction.

[Formula 5]

AAAAA|ABA|AAAABA|BAA|AAAAAABAAABABBAA

According to NMR-$^{13}$C, in the following formula, each of carbons at 4th positions represented by α and β in the A skeleton exhibits an inherent shift value due to influence from right and left skeletons. In the following formula, the carbons at the 4th positions receive influence from the right and left B skeletons. Accordingly, each of the triads represented by ABA, BAA, AAA, AAB, BBA, BAB, ABB and BBB contained in the chain can be represented by a percentage.

[Formula 7]

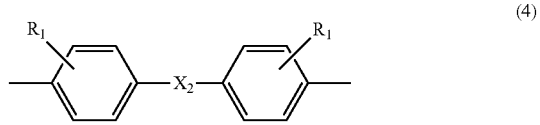

In the formula (4), $X_2$ represents an oxygen atom or $CR^3R^4$ and $R^1$ represents a hydrogen atom or a methyl group.

$R^3$ and $R^4$ each independently represent a hydrogen atom or an alkyl group having 1 to 3 carbon atoms. Alternatively, $R^3$ and $R^4$ form a ring to provide a substituted or unsubstituted cycloalkyl group having 5 to 6 ring carbon atoms. $R^3$ and $R^4$ may be the same group or different groups.

In the formula (4), examples of the alkyl group having 1 to 3 carbon atoms for $R^3$ and $R^4$ are a linear alkyl group or branched alkyl group. Examples of the linear alkyl and branched alkyl group are a methyl group, ethyl group and various propyl groups. The substituted or unsubstituted cycloalkyl group formed by $R^3$ and $R^4$ and having 5 to 6 ring carbon atoms is exemplified by a cyclohexyl group.

In the formula (4), when the cyclohexyl group has a substituent, the substituent is exemplified by an alkyl group having 1 to 3 carbon atoms. Examples of the alkyl group having 1 to 3 carbon atoms are the same as those described for $R^3$ and $R^4$.

When $X_2$ is $CR^3R^4$ in the formula (4), $R^3$ and $R^4$ are preferably not the same group but different groups in terms of wear resistance. In this case, for instance, the group represented by the formula (4) is preferably a divalent group derived from 2,2-bis(4-hydroxyphenyl)butane.

[Formula 6]

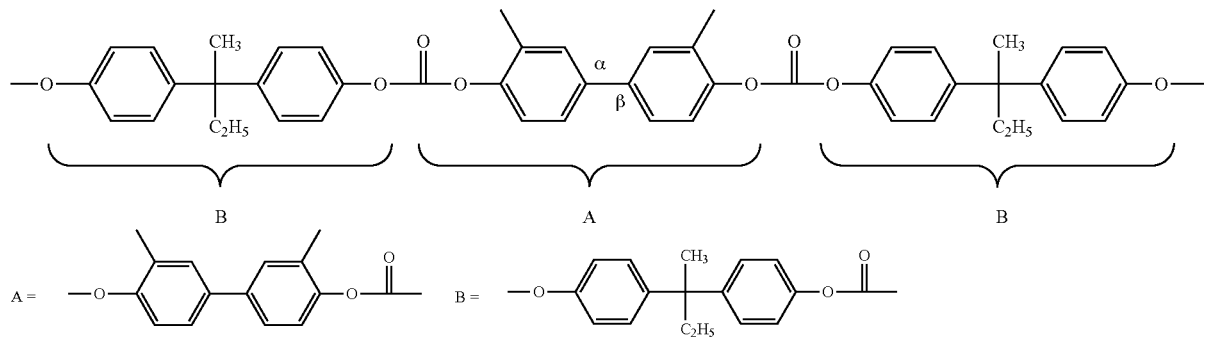

In the PC copolymer according to the exemplary embodiment, provided that a mole percentage of total repeating units of the repeating unit represented by the formula (1) and the repeating unit represented by the formula (2) is defined as 100 mol %, a mole percentage of the repeating unit represented by the formula (1) is preferably in a range from 52 mol % to 72 mol %, and a mole percentage of the repeating unit represented by the formula (2) is preferably in a range from 28 mol % to 48 mol %, and provided that total triads contained in a chain of the repeating units is defined as 100 mol %, a mole percentage of a triad that is three repeating units represented by the formula (1) in a row is preferably 5 mol % or less, and $Ar^2$ is preferably a group represented by a formula (4) below, In the PC copolymer in the exemplary embodiment, a mole percentage of the repeating unit represented by the formula (1) (hereinafter, the repeating unit represented by the formula (1) is also referred to as an $Ar^1$ skeleton unit) is preferably in a range from 52 mol % to 72 mol %, more preferably in a range from 55 mol % to 70 mol %, further preferably in a range from 58 mol % to 65 mol %. When the $Ar^1$ skeleton unit is 72 mol % or less, an increase in a block of bonded $Ar^1$ skeleton units in a highly regular structure is inhibited, so that crystallization is inhibited. Accordingly, solubility is improved to provide favorable electrophotographic characteristics. When the mole percentage of the $Ar^1$ skeleton unit is 52 mol % or more, a noticeable decrease in the electrical strength is prevented, so that electrification deterioration is unlikely to occur. Accordingly, the mechanical strength (e.g., wear resistance) and the electrical strength can be satisfied at the same time. The aforementioned mol % is a value obtained when a molar copolymer composition is represented by a percentage. The molar copolymer composition can be measured from nuclear magnetic resonance spectrum. Specifically, the molar copolymer composition can be measured by a method described in Examples. The electrical strength refers to a property that electrical deterioration is unlikely to occur.

In the PC copolymer in the exemplary embodiment, a mole percentage of the repeating unit represented by the formula (2) (hereinafter, the repeating unit represented by the formula (2) is also referred to as an $Ar^2$ skeleton unit) is preferably in a range from 28 mol % to 48 mol %, more preferably in a range from 30 mol % to 45 mol %, further preferably in a range from 35 mol % to 42 mol %. When the $Ar^2$ skeleton unit is 48 mol % or less, a ratio of the $Ar^1$ skeleton unit is not decreased, so that advantages of the $Ar^1$ skeleton unit and advantages of the $Ar^2$ skeleton unit can be obtained in a balanced manner. Moreover, without such disadvantages that the solubility becomes excessively high to adversely deteriorate solvent resistance, generation of cracks is inhibited. When the $Ar^2$ skeleton unit is 28 mol % or more, the advantages of $Ar^2$ is sufficiently obtained, so that the wear resistance and the solubility of the PC copolymer become sufficient.

The PC copolymer having the repeating unit represented by the formula (1) and the repeating unit represented by the formula (2) is preferably a PC copolymer represented by a formula (8) below.

[Formula 8]

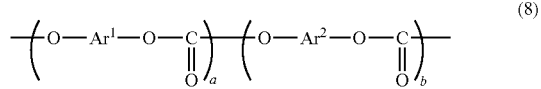

(8)

In the formula (8), a represents a molar copolymer ratio of the repeating unit represented by the formula (1) and b represents a molar copolymer ratio of the repeating unit represented by the formula (2).

a is a value equivalent to a mole percentage of the $Ar^1$ skeleton unit, provided that a mole percentage of total repeating units of the $Ar^1$ skeleton unit and the $Ar^2$ skeleton unit is defined as 100 mol %. As described above, a is preferably in a range of 0.52 to 0.72. b is a value equivalent to a mole percentage of the $Ar^2$ skeleton unit, provided the mole percentage of total repeating units of the $Ar^1$ skeleton unit and the $Ar^2$ skeleton unit is defined as 100 mol %. b is preferably in a range of 0.28 to 0.48.

$Ar^1$ in the formulae (1), (8) and (100) is preferably a divalent group derived from a compound selected from the group consisting of 3,3'-dimethyl-4,4'-biphenol and bis(3-methyl-4-hydroxyphenyl)ether.

$Ar^2$ in the formulae (2) and (8) is preferably a divalent group derived from a compound selected from the group consisting of bis(4-hydroxyphenyl)ether, 2,2-bis(4-hydroxyphenyl)butane and 1,1-bis(4-hydroxyphenyl)cyclohexane. Among the above, $Ar^2$ is particularly preferably a divalent group derived from 2,2-bis(4-hydroxyphenyl)butane.

A chain end of the PC copolymer represented by the formula (8) in the exemplary embodiment is preferably terminated by a terminal terminator. The chain end of the PC copolymer is preferably terminated by a monovalent aromatic group or a monovalent fluorine-containing alcohol.

The monovalent aromatic group is preferably an aryl group having 6 to 12 carbon atoms. Examples of the aryl group are a phenyl group and a biphenyl group. Examples of a substituent to be bonded to the aromatic group and the aliphatic group (e.g., alkyl group) bonded to the aromatic group are halogen atoms such as a fluorine atom, a chlorine atom and a bromine atom. The substituent bonded to the aromatic group is exemplified by an alkyl group having 1 to 20 carbon atoms. This alkyl group may be a group bonded by a halogen atom as described above and a group bonded by an aryl group.

The monovalent fluorine-containing alcohol is preferably a monovalent fluorine-containing alcohol provided by bonding a plurality of fluoroalkyl chains each having 2 to 6 carbon atoms via an ether bond, the monovalent fluorine-containing alcohol having 13 to 19 fluorine atoms in total. When the total fluorine atoms are 13 or more, sufficient water repellency and oil repellency can be obtained. On the other hand, when the total fluorine atoms are 19 or less, a decrease in reactivity in polymerization can be inhibited to improve the mechanical strength, surface hardness, heat resistance and the like of the obtained polycarbonate copolymer.

Further, a fluorine-containing alcohol having two or more ether bonds is also preferable. By using such a fluorine-containing alcohol, the dispersibility of the PC copolymer can be improved to enhance the wear resistance, so that surface lubricity, water repellency and oil repellency can be kept even after the PC copolymer is worn.

Among the above, the chain end is preferably terminated by a monovalent phenol represented by a formula (5) below or a monovalent fluorine-containing alcohol represented by a formula (6) below in order to improve the electrical characteristics and the wear resistance.

[Formula 9]

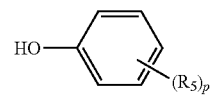

(5)

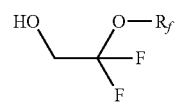

(6)

In the formula (5), $R_5$ represents an alkyl group having 1 to 10 carbon atoms or a fluoroalkyl group having 1 to 10 carbon atoms. p represents an integer of 1 to 3.

In the formula (6), $R_f$ represents a perfluoroalkyl group having 5 or more carbon atoms and having 11 or more fluorine atoms or a perfluoroalkyloxy group represented by a formula (7) below.

[Formula 10]

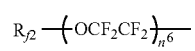

(7)

In the formula (7), $R_{f2}$ represents a linear or branched perfluoroalkyl group having 1 to 6 carbon atoms. $n^6$ represents an integer of 1 to 3.

In the exemplary embodiment, a reduced viscosity [$\eta_{SP}/C$] of the PC copolymer is defined as a value obtained in a solution where the PC copolymer is dissolved in a solvent of methylene chloride at a concentration of 0.5 g/dL at 20 degrees C. The reduced viscosity [$\eta_{SP}/C$] of the PC copolymer in the exemplary embodiment is preferably in a range from 0.1 dL/g to 5 dL/g, more preferably in a range from 0.2 dL/g to 3 dL/g, further preferably in a range from 0.3 dL/g to 2.5 dL/g. When the reduced viscosity [$\eta_{SP}/C$] is 0.1 dL/g, the PC copolymer exhibits a sufficient wear resistance in use as the electrophotographic photoreceptor. When the reduced viscosity [$\eta_{SP}/C$] is 5 dL/g or less, a coating viscosity of the PC copolymer can be kept suitable for manufacturing a molding (e.g., the electrophotographic photoreceptor) from a coating liquid, so that productivity of the molding (e.g., the electrophotographic photoreceptor) is maintained or improved.

Manufacturing Method of PC Copolymer

The PC copolymer of the exemplary embodiment is suitably obtainable by interfacial polycondensation of a bischloroformate oligomer represented by the formula (100) below and a divalent phenol compound represented by a formula (11) below in the presence of an acid-binding agent. Alternatively, the PC copolymer of the exemplary embodiment is suitably obtainable by interfacial polycondensation of a bischloroformate oligomer represented by the formula (100) below, a bisphenol compound represented by a formula (10) below and the divalent phenol compound represented by the formula (11) below in the presence of the acid-binding agent. The above reaction(s) is conducted under the presence of terminal terminators represented by the formulae (5) and (6) and/or a branching agent as needed.

[Formula 11]

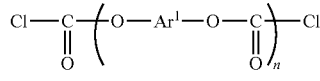
(100)

[Formula 12]

(10)

(11)

In the formula (10), $Ar^1$ represents a group represented by a formula (3) below. In the formula (11), $Ar^2$ represents a divalent aromatic group.

[Formula 13]

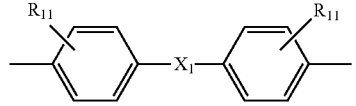
(3)

$X_1$ represents a single bond or an oxygen atom in the formula (3). $R_{11}$ each independently represents a methyl group or an ethyl group.

Herein, n in the formula (100) represents an average number of monomer units of the bischloroformate oligomer. In the bischloroformate oligomer of the formula (100), the average number of the monomer units n is in a range of 1.0 to 1.3. Even when the bisphenol compound represented by the formula (10) and the divalent phenol compound represented by the formula (11) are simultaneously used, use of the bischloroformate oligomer having the average number of monomer units in a range from 1.0 to 1.3 inhibits formation of a block having a high number of monomer units exceeding the number of monomer units of the bischloroformate oligomer represented by the formula (100), thereby facilitating manufacturing of the PC copolymer.

Incidentally, even when the bischloroformate oligomer of the formula (10) having the average number of monomer units of 1.0 is reacted with the divalent phenol compound (comonomer) of the formula (11) at a molar ratio of 1:1, the abundance ratio of $Ar^1$ often exceeds 50 mol %. This is because, when the manufactured bischloroformate oligomer represented by the formula (100) is reacted with the comonomer represented by the formula (11), a chloroformate group at the end of the bischloroformate oligomer may be reacted with a base present in a reaction system to form a hydroxyl group, resulting in polycondensation of the hydroxyl group with another $Ar^1$ oligomer (a bischloroformate oligomer represented by the formula (100)) having chlorine at its end.

A method for calculating the average number of monomer units n is exemplified by a method described later in Examples.

Examples of the bisphenol compound represented by the formula (10) include 3,3'-dimethyl-4,4'-biphenol, bis(3-methyl-4-hydroxyphenyl)ether, 3,3'-diethyl-4,4'-biphenol, and bis(3-ethyl-4-hydroxyphenyl)ether.

Moreover, the PC copolymer using the bisphenol compound is preferable since a favorable coating liquid can be obtained when the PC copolymer using the bisphenol compound is used for the electrophotographic photoreceptor.

Next, examples of the divalent phenol compound represented by the formula (11) include bis(4-hydroxy phenyl) ether, 2,2-bis(4-hydroxy phenyl)propane, 2,2-bis(4-hydroxy phenyl)butane, 2,2-bis(4-hydroxy phenyl)pentane, 1,1-bis (4-hydroxy phenyl)ethane, 1,1-bis(4-hydroxy phenyl)propane, 1,1-bis(4-hydroxy phenyl)butane, 3,3-bis(4-hydroxy phenyl)hexane, 4,4-bis(4-hydroxy phenyl)heptane, 1,1-bis (4-hydroxy phenyl)cyclohexane, 1,1-bis(4-hydroxy phenyl) cyclopentane, and 1,1-bis(4-hydroxy phenyl)-3-methylcyclohexane.

Among the above divalent phenol compounds, bis(4-hydroxyphenyl)ether, 2,2-bis(4-hydroxyphenyl)butane and 1,1-bis(4-hydroxyphenyl)cyclohexane are preferable since the obtained PC copolymer exhibits an excellent wear resistance. One of the divalent phenol compounds may be used alone, or two or more thereof may be used in combination.

In the manufacturing method of the PC copolymer in the exemplary embodiment, monovalent phenol and fluorine-containing alcohol are usable as the terminal terminator for terminating the chain end.

Preferable examples of the fluorine-containing alcohol include fluorine-containing alcohol represented by a formula (30) or (31) below and 1,1,1,3,3,3-hexafluoro-2-propanol. Furthermore, fluorine-containing alcohol with an ether bond represented by formulae (14), (15) and (16) below are also preferably used.

$$H(CF_2)_nCH_2OH \quad (30)$$

$$F(CF_2)_mCH_2OH \quad (31)$$

In the formula (30), n represents an integer of 1 to 12. In the formula (31), m represents an integer of 1 to 12.

[Formula 14]

$$F—(CF_2)_n{}^{31}—OCF_2CH_2—OH \quad (14)$$

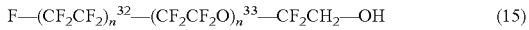

$$F—(CF_2CF_2)_n{}^{32}—(CF_2CF_2O)_n{}^{33}—CF_2CH_2—OH \quad (15)$$

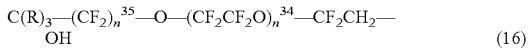

$$C(R)_3—(CF_2)_n{}^{35}—O—(CF_2CF_2O)_n{}^{34}—CF_2CH_2—OH \quad (16)$$

In the formula (14), $n^{31}$ is an integer of 1 to 10, preferably an integer of 5 to 8.

In the formula (15), $n^{32}$ is an integer of 0 to 5, preferably an integer of 0 to 3 and $n^{33}$ is an integer of 1 to 5, preferably an integer of 1 to 3.

In the formula (16), $n^{34}$ is an integer of 1 to 5, preferably an integer of 1 to 3, $n^{35}$ is an integer of 0 to 5, preferably an integer of 0 to 3, and R is $CF_3$ or F.

Among the above, the chain end is preferably terminated by a monovalent phenol represented by the formula (5) below or a monovalent fluorine-containing alcohol represented by the formula (6) below in order to improve the electrical characteristics and the wear resistance.

[Formula 15]

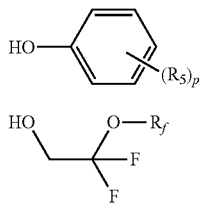

In the formula (5), $R_5$ represents an alkyl group having 1 to 10 carbon atoms or a fluoroalkyl group having 1 to 10 carbon atoms. p represents an integer of 1 to 3.

In the formula (6), $R_f$ represents a perfluoroalkyl group having 5 or more carbon atoms and having 11 or more fluorine atoms or a perfluoroalkyloxy group represented by the formula (7) below.

[Formula 16]

$$R_{f2}—(OCF_2CF_2)_{n^6}— \quad (7)$$

In the formula (7), $R_{f2}$ represents a linear or branched perfluoroalkyl group having 1 to 6 carbon atoms. $n^6$ represents an integer of 1 to 3.

Examples of the monovalent phenol represented by the formula (5) include p-tert-butylphenol, p-perfluorononylphenol, p-perfluorohexylphenol, p-tert-perfluorobutylphenol, and p-perfluorooctylphenol.

Specifically, in the exemplary embodiment, the chain end is preferably terminated by the terminal terminator selected from the group consisting of p-tert-butylphenol, p-perfluorononylphenol, p-perfluorohexylphenol, p-tert-perfluorobutylphenol, and p-perfluorooctylphenol.

Examples of the above fluorine-containing alcohol represented by the formula (6) with the ether bond are compounds as follows. Specifically, the chain end in the exemplary embodiment is preferably terminated by the terminal terminator selected from any one of the following fluorine-containing alcohol.

[Formula 17]

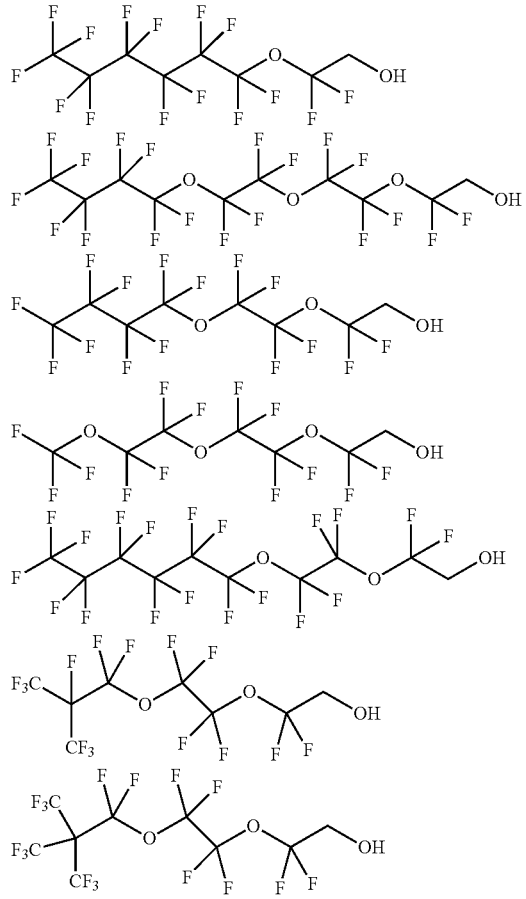

A ratio of the added terminal terminator is preferably in a range from 0.05 mol % to 30 mol %, further preferably in a range from 0.1 mol % to 10 mol % in the mole percentage of the copolymer composition of the $Ar^1$ skeleton unit, the $Ar^2$ skeleton unit and the chain end. When the ratio of the added terminal terminator is 30 mol % or less, a decrease in the mechanical strength is inhibited. When the ratio of the added terminal terminator is 0.05 mol % or more, a decrease in molding performance is inhibited.

Examples of the branching agent usable in the manufacturing method of the PC copolymer in the exemplary embodiment include phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenyl isopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin and 5-bromoisatin.

An additive amount of the branching agent is preferably 30 mol % or less, more preferably 5 mol % or less in the copolymer composition ratio. When the additive amount of the branching agent is 30 mol % or less, a decrease in molding performance is inhibited.

Examples of the acid-binding agent usable in interfacial polycondensation include: alkali metal hydroxides such as sodium hydroxide, potassium hydroxide, lithium hydroxide and cesium hydroxide; alkaline earth metal hydroxides such as magnesium hydroxide and calcium hydroxide; alkali metal weak acidic salts and alkaline earth metal weak acidic salts such as sodium carbonate, potassium carbonate and calcium acetate; and organic bases such as pyridine. Preferable examples of the acid-binding agent usable in interfacial polycondensation include alkali metal hydroxides and alkaline earth metal hydroxides such as sodium hydroxide, potassium hydroxide and calcium hydroxide. These acid binding agents are also usable in a mixture. A use ratio of the acid-binding agent may be also suitably adjusted in consideration of stoichiometric proportion (equivalent amount) in the reaction. Specifically, it is only required to use 1 equivalent or more, preferably 1 equivalent to 10 equivalent of the acid-binding agent per 1 mol of the total amount of a hydroxyl group of the divalent phenol (material).

A solvent used in the manufacturing method of the PC copolymer in the exemplary embodiment is only required to exhibit solubility to the obtained copolymer at a predetermined level or more. Examples of the solvent are: aromatic hydrocarbon such as toluene and xylene; halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene; ketones such as cyclohexaneone, acetone and acetophenone; and ethers such as tetrahydrofuran and 1,4-dioxane. One of the above solvents may be used alone, or two or more of the above may be used in combination. With use of two solvents that are not miscible with each other, interfacial polycondensation may be conducted.

Preferable examples of a catalyst used in the manufacturing method of the PC copolymer in the exemplary embodiment include: tertiary amines such as trimethylamine, triethylamine, tributylamine, N,N-dimethylcyclohexyl amine, pyridine, N,N-diethyl aniline and N,N-dimethyl aniline; quaternary ammonium salts such as trimethyl benzyl ammonium chloride, triethyl benzyl ammonium chloride, tributyl benzyl ammonium chloride, trioctyl methyl ammonium chloride, tetrabutyl ammonium chloride and tetrabutyl ammonium bromide; and quaternary phosphonium salts such as tetrabutyl phosphonium chloride and tetrabutyl phosphonium bromide.

Further, a small amount of an antioxidant such as sodium sulfite and hydrosulfite salt may be added as needed to the reaction system in the manufacturing method of the PC copolymer in the exemplary embodiment.

The manufacturing method of the PC copolymer in the exemplary embodiment is specifically compatible with various manufacturing methods of the PC copolymer in addition to the above-described manufacturing method. For instance, the bischloroformate compound of the formula (100) is manufactured by reacting the bisphenol compound of the formula (10) with phosgene and the like. Subsequently, applicable is a method in which this bischloroformate oligomer is reacted with the compound of the formula (11) or with the compound of the formula (10) and the compound of the formula (11) in the presence of a mixture of the above solvent and the alkali aqueous solution of the above acid binding agent. This method is preferable since the mole percentage of the $Ar^1$ skeleton unit relative to the mole percentage of the total repeating units defined as 100 mol % is adjustable in a preferable range.

The manufacturing method of the bischloroformate oligomer having the value of n in the formula (100) in a range of 1.0 to 1.3 (having a small number of monomer units) is exemplified by a manufacturing method below. The manufacturing method below of the bischloroformate oligomer is preferable, for instance, since use of the obtained bischloroformate oligomer simplifies a cleaning process in manufacturing the polycarbonate copolymer.

In the manufacturing method of the bischloroformate oligomer having a small number of monomer units, firstly, the bisphenol compound of the formula (10) is suspended in a hydrophobic solvent such as methylene chloride and then added with phosgene to form a mixed solution (first solution). On the other hand, a tertiary amine such as triethylamine is dissolved in a hydrophobic solvent such as methylene chloride to form a second solution. The second solution is dropped into the above mixed solution for reaction. Hydrochloric acid and deionized water are added to a third solution containing the obtained reactant mixture to be cleaned. An organic layer including a polycarbonate oligomer having a small number of monomer units is obtained.

A dropping temperature and a reaction temperature are preferably typically in a range from −10 degrees C. to 40 degrees C., preferably in a range from 0 degrees C. to 30 degrees C. A dropping time and a reaction time are in a range from 15 minutes to 4 hours, preferably from 30 minutes to about 3 hours. The thus obtained polycarbonate oligomer preferably has an average number of monomer units (n) in a range of 1.0 to 1.3, more preferably of 1.0 to 1.2.

The aromatic divalent phenol monomer represented by the formula (11) is added to the organic phase containing the thus obtained bischloroformate oligomer having a small number of monomer units to be reacted. The reaction temperature is preferably in a range from 0 degrees C. to 150 degrees C., more preferably in a range from 5 degrees C. to 40 degrees C., further preferably in a range from 7 degrees C. to 20 degrees C.

A reaction pressure may be any one of a reduced pressure, a normal pressure and an added pressure. Typically, the reaction can be favorably performed under a pressure that is approximately equal to the normal pressure or a self-pressure of the reaction system. The reaction time, which is dependent on the reaction temperature, is typically in a range of 0.5 minute to 10 hours, preferably of 1 minute to about 3 hours.

In the reaction, the divalent phenol compound represented by the formula (11) is desirably added in a form of an aqueous solution or an organic-solvent solution. The order of the addition is not specifically limited. In the above manufacturing method, the catalyst, the terminal terminator, the branching agent and the like may be added as needed at the time of manufacturing the bischloroformate oligomer or at the time of subsequent polymerization reaction, or both at the time of manufacturing the bischloroformate oligomer and at the time of subsequent polymerization reaction.

The thus obtained PC copolymer includes the repeating unit(s) represented by the formula (1) and the repeating unit(s) represented by the formula (2).

As long as an object of the invention is not hampered, the PC copolymer may contain a polycarbonate unit having a structure unit other than those of $Ar^1$ and $Ar^2$ or a unit having a polyester structure or a polyether structure.

For controlling the reduced viscosity $[\eta_{sp}/C]$ of the obtained PC copolymer to be within the above-described range, various methods, such as a method of selecting the reaction conditions and a method of adjusting the use amount of the branching agent and the terminal terminator, are available. In addition, if necessary, the PC copolymer may be subjected to a physical treatment such as mixing and cutoff and/or a chemical treatment such as polymer reaction, cross linking or partial degradation, so that the PC copolymer having a predetermined reduced viscosity $[\eta_{sp}/C]$ may be obtained.

The obtained reaction product (crude product) may be subjected to various aftertreatments such as known separation and refinement, so that the PC copolymer having desirable purity (desirable refining degree) may be obtained.

Structure of Coating Liquid

A coating liquid according to the exemplary embodiment at least contains the PC copolymer according to the exemplary embodiment and a solvent capable of dissolving or dispersing the PC copolymer according to the exemplary embodiment. Moreover, in addition to the above PC copolymer and organic solvent, the coating liquid may contain a low molecular compound, a colorant such as a dye and a pigment, a functional compound such as a charge transporting material, an electron transporting material, a hole transporting material and a charge generating material, a filler such as an inorganic or organic filler, fiber and particles, and an additive such as an antioxidant, a UV absorbent and an acid scavenger. Substances that may be contained besides the PC copolymer are exemplified by substances contained in the components for the electrophotographic photoreceptor described later. The coating liquid may contain other resins as long as the advantages of this exemplary embodiment are not hampered. The coating liquid is exemplified by the following components of the electrophotographic photoreceptor. As the organic solvent usable in this exemplary embodiment, a single solvent may be used or a plurality of solvents may be used by mixture, considering solubility, dispersibility, viscosity, evaporation speed, chemical stability and stability against physical changes of the PC copolymer according to this exemplary embodiment and other materials. The solvent is exemplified by the components of the electrophotographic photoreceptor described later.

The concentration of the PC copolymer component in the coating liquid in the exemplary embodiment is sufficient as long as the coating liquid can exhibit a viscosity suitable for usage. The concentration is preferably in a range of 0.1 mass % to 40 mass %, more preferably of 1 mass % to 35 mass %, further preferably of 5 mass % to 30 mass %. When the concentration of the PC copolymer component exceeds 40 mass %, coating performance is deteriorated due to excessively high viscosity. When the concentration of the PC copolymer component is less than 0.1 mass %, the coating liquid may flow away due to excessively low viscosity, so that a uniform film cannot be obtained. For drying the obtained film, long time may be required due to excessively low concentration of the coating liquid, so that a desired thickness of the film may not be obtained.

The PC copolymer according to this exemplary embodiment has a good compatibility with the charge transporting material and is not whitened or gelled even when dissolved in the organic solvent. Accordingly, the coating liquid according to this exemplary embodiment containing the PC copolymer according to this exemplary embodiment, the charge transporting material and the solvent can be stably stored without whitening or gelation of the PC polymer components over a long period of time. When a photosensitive layer of the electrophotographic photoreceptor is formed with use of the coating liquid, an excellent electrophotographic photoreceptor having no defect on an image without crystallization of the photosensitive layer is obtainable.

A ratio of the PC copolymer to the charge transporting substance in the coating liquid is preferably typically 20:80 to 80:20 by mass, preferably 30:70 to 70:30 by mass.

In the coating liquid in the exemplary embodiment, one of the PC copolymer in the exemplary embodiment may be used alone, or two or more of the above PC copolymer may be used together.

The coating liquid in the exemplary embodiment is preferably used for forming the charge transporting layer of a laminated electrophotographic photoreceptor in which a sensitive layer at least includes the charge generating layer and the charge transporting layer. When the coating liquid in the exemplary embodiment further contains the charge generating substance, the coating liquid is also usable for forming a sensitive layer of a single-layer electrophotographic photoreceptor.

Structure of Molded Product

A molding according to the exemplary embodiment contains at least one of the PC copolymer according to the exemplary embodiment and the coating liquid according to the exemplary embodiment.

The molding is exemplified by an optical member, examples of which include an electrophotographic photoreceptor and an optical lens. When a base material is in a form of a film, the molding in a form of a laminated film is usable as, for instance, a film used for in-mold molding and a decorative film. In addition, the laminated film is also usable as a touch panel film, an optical film such as an optical compensation film and an antireflective film, and a conductive film, which are used for liquid crystal, an organic EL display and the like.

Since the molding according to the exemplary embodiment contains the PC copolymer according to the exemplary embodiment, the molding exhibits an excellent transparency without whitening, an excellent mechanical strength (e.g., wear resistance) and an excellent electrical strength.

Structure of Electrophotographic Photoreceptor

The electrophotographic photoreceptor according to the exemplary embodiment may be in any form in addition to various known forms of the electrophotographic photoreceptor as long as the PC copolymer according to the exemplary embodiment is used in a photosensitive layer. The photosensitive layer of the electrophotographic photoreceptor in the exemplary embodiment is preferably a laminated electrophotographic photoreceptor including at least one charge generating layer and at least one charge transporting layer, or alternatively the photosensitive layer of the electrophotographic photoreceptor is preferably a single-layer electrophotographic photoreceptor including both a charge generating substance and a charge transporting substance.

The PC copolymer may be used in any part of the photosensitive layer. For instance, in order for the invention to sufficiently provide an advantage, the PC copolymer is preferably used as the binder resin of the charge transporting substance, as the binder resin of the single photosensitive layer or as a surface protecting layer. When the electrophotographic photoreceptor has double charge transporting layers (i.e., multilayer electrophotographic photoreceptor), the PC copolymer is preferably used in either one of the charge transporting layers.

In the electrophotographic photoreceptor according to this exemplary embodiment, one type of the PC copolymer according to this exemplary embodiment may be used alone, or two or more types thereof may be used together. Further, as long as an object of the invention is not hampered, a binder-resin component such as another polycarbonate may be contained as desired. In addition, an additive such as an antioxidant may be contained.

The electrophotographic photoreceptor according to this exemplary embodiment includes a conductive substrate and a photosensitive layer provided on the conductive substrate. When the photosensitive layer has the charge generating layer and the charge transporting layer, the charge transporting layer may be laminated on the charge generating layer, or the charge generating layer may be laminated on the charge transporting layer. Alternatively, a single layer of the electrophotographic photoreceptor may contain both the charge generating substance and the charge transporting substance. Further, when necessary, a surface layer of the electrophotographic photoreceptor may be provided with a conductive or insulating protective film. Furthermore, the electrophotographic photoreceptor may be further provided with an intermediate layer(s) such as adhesive layer for enhancing adhesion between layers and blocking layer for blocking charges.

Various known materials are usable as the conductive substrate material used in the electrophotographic photoreceptor in the exemplary embodiment. Examples of such conductive substrate materials are: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer at least contains a charge generating material. The charge generating layer can be obtained by forming a layer of the charge generating material on the underlying substrate by vacuum deposition, sputtering or the like, or by forming a layer in which the charge generating material is bound onto the underlying substrate with use of a binder resin. Various known methods are usable as the method for forming the charge generating layer using the binder resin. The method for forming the charge generating layer is preferably a method in which the charge generating layer is typically obtained as a wet molding typically formed by applying, for instance, a coating agent in which both the charge generating material and the binder resin are dispersed or dissolved in a suitable solvent onto a predetermined underlying substrate and drying the applied coating agent.

Various known materials are usable as the charge generating material in the charge generating layer. Examples of the charge generating material include: elementary selenium such as amorphous selenium and trigonal selenium; selenium alloy such as selenium-tellurium; selenium compound or selenium-containing composition such as $As_2Se_3$; inorganic material formed of 12 group element and 16 group element in the periodic system such as zinc oxide and CdS—Se; oxide-base semiconductor such as titanium oxide; silicon-base material such as amorphous silicon; metal-free phthalocyanine pigment such as τ-type metal-free phthalocyanine and χ-type metal-free phthalocyanine; metal phthalocyanine pigment such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2θ has its diffraction peak at 27.3±0.2 degrees in a X-ray diffraction diagram, and gallium phthalocyanine; cyanine dye; anthracene pigment; bisazo pigment; pyrene pigment; polycyclic quinone pigment; quinacridone pigment; indigo pigment; perylene pigment; pyrylium dye; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be used alone, or two or more thereof may be mixed for use as the charge generating substance. Among the above charge generating substances, a charge generating substance disclosed in JP-A-11-172003 is preferable.

The charge transporting layer can be obtained as a wet molding by forming a layer in which the charge transporting substance is bound onto the underlying substrate by a binder resin.

The binder resin for the charge generating layer and the charge transporting layer is not specifically limited. Various known resins are usable. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride-base polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be used alone, or two or more thereof may be mixed for use. The binder resin used in the charge generating layer and the charge transporting layer is preferably the PC copolymer according to this exemplary embodiment.

Various known methods are usable as the method for forming the charge transporting layer. The method for forming the charge transporting layer is preferably a method in which the charge transporting layer is obtained as a wet molding formed by applying a coating liquid in which both the charge transporting substance and the PC copolymer in the exemplary embodiment are dispersed or dissolved in a suitable solvent onto a predetermined underlying substrate and drying the applied coating liquid. A blend ratio of the charge transporting substance and the PC copolymer for forming the charge transporting layer is preferably 20:80 to 80:20 by mass, more preferably 30:70 to 70:30 by mass.

In the charge transporting layer, one of the PC copolymer in the exemplary embodiment may be used alone, or two or more thereof may be used together. As long as an object of the invention is not hampered, the charge transporting layer may also contain another binder resin in addition to the PC copolymer according to this exemplary embodiment.

The thickness of the charge transporting layer is typically approximately 5 µm to 100 µm, preferably 10 µm to 30 µm. When the thickness of the charge transporting layer is less than 5 µm, the initial potential may be lowered. When the thickness is more than 100 µm, electrophotographic characteristics may be deteriorated.

Various known compounds are usable as the charge transporting substance that is usable together with the PC copolymer in the exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be used alone, or two or more of the above may be used together. Among the above charge transporting substances, specifically exemplified compounds disclosed in JP-A-11-172003 and charge transporting substances represented by the following structures are particularly preferably used.

[Formula 18]

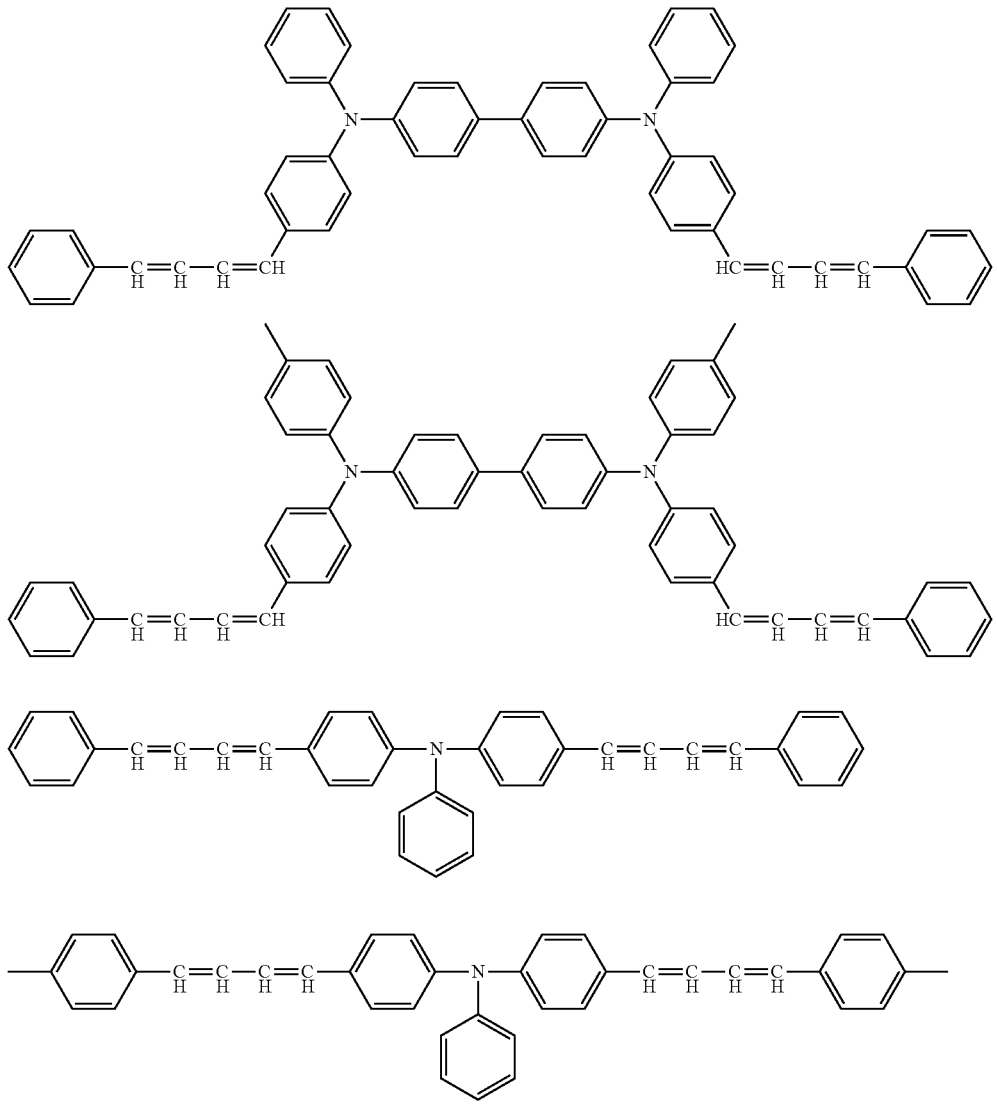

-continued
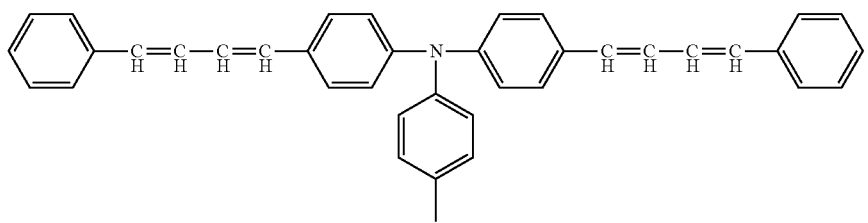
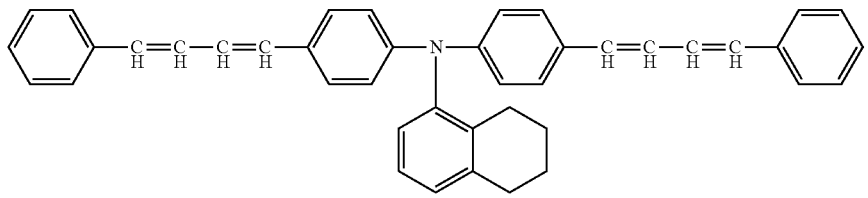
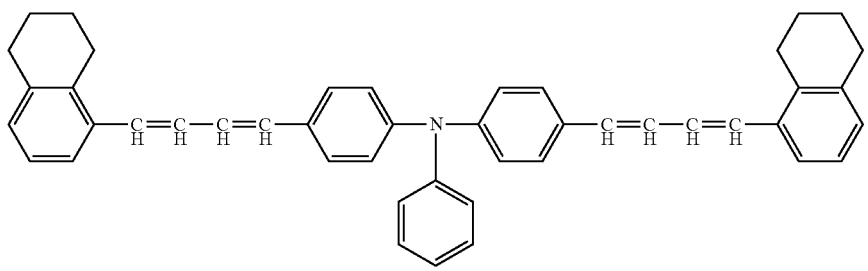
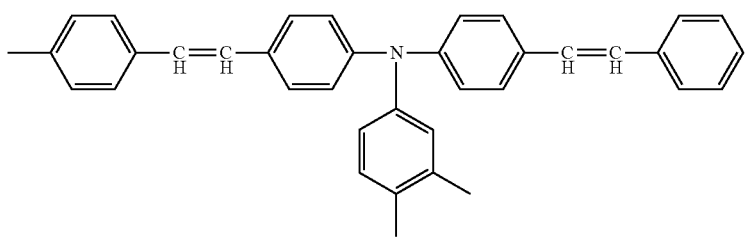
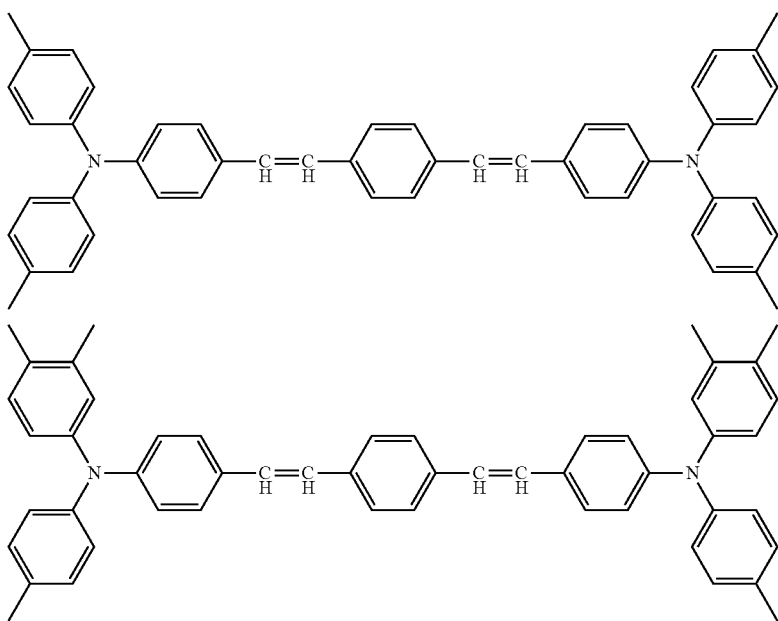

[Formula 19]
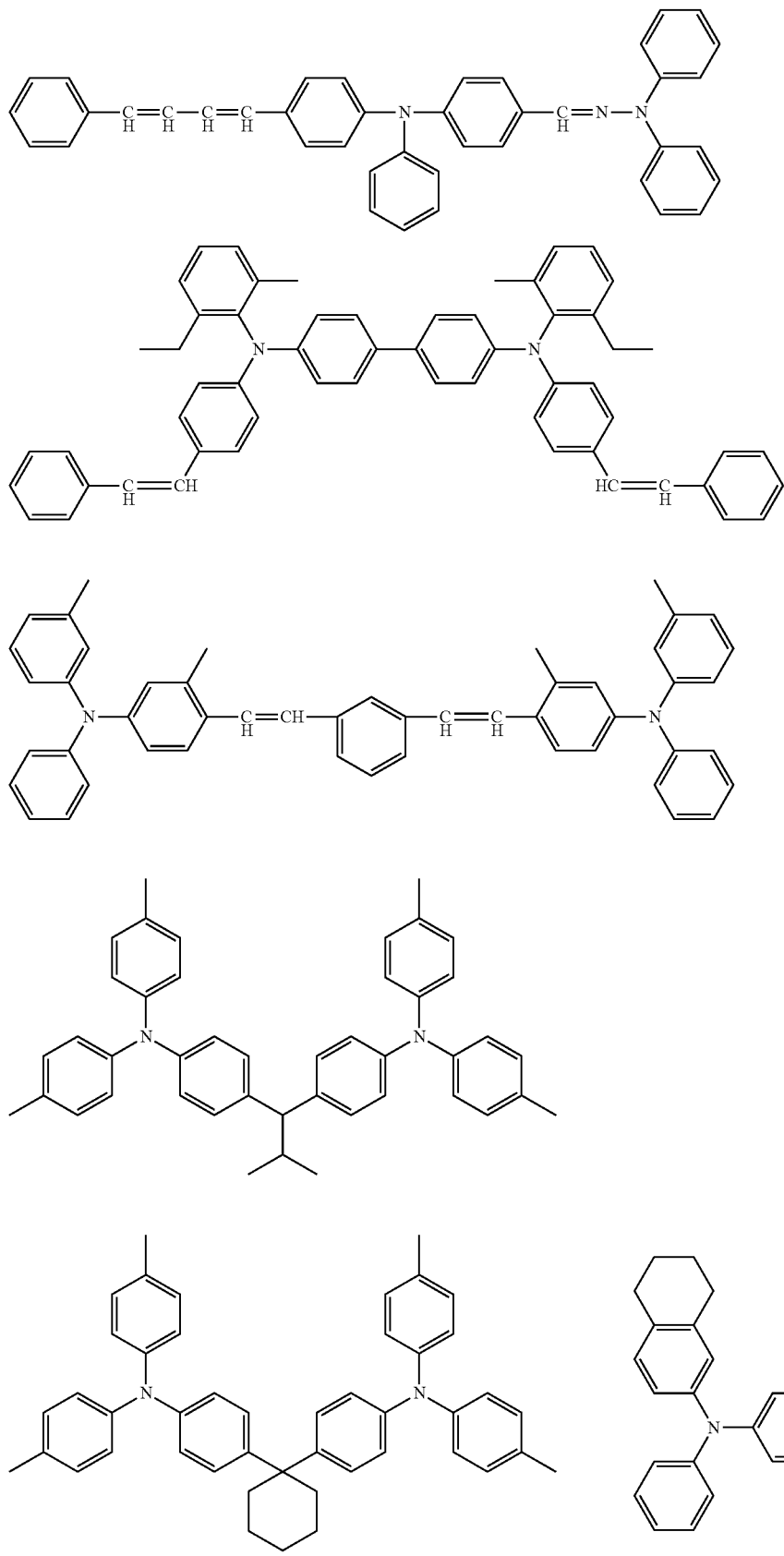

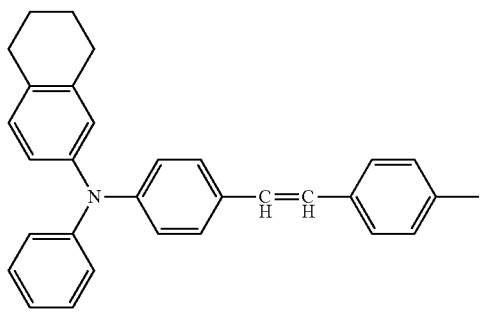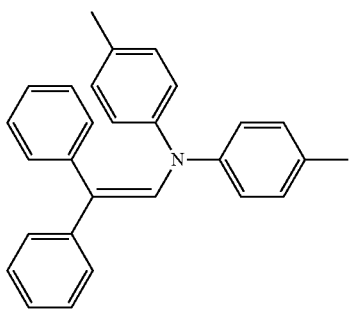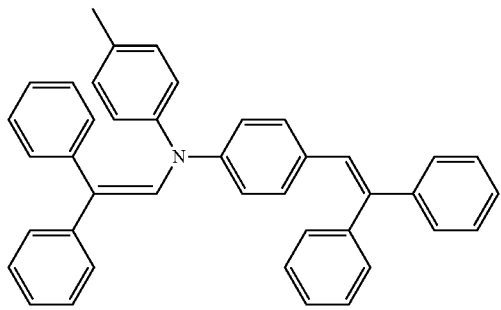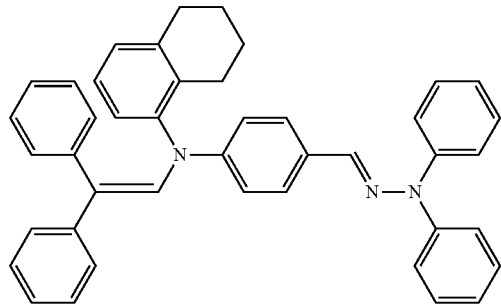
[Formula 20]
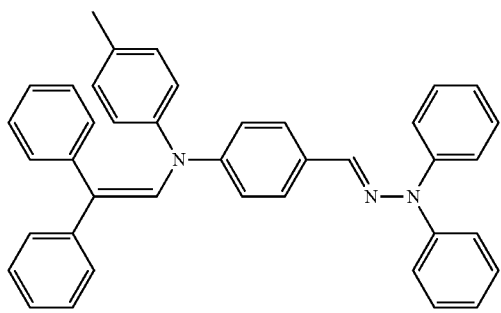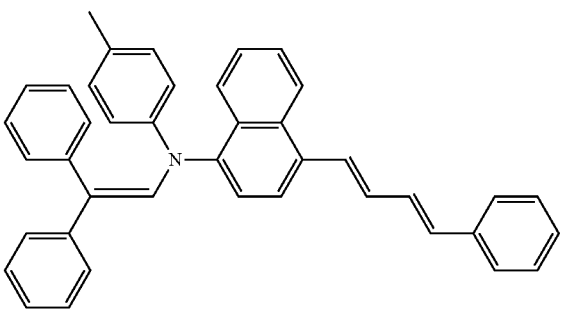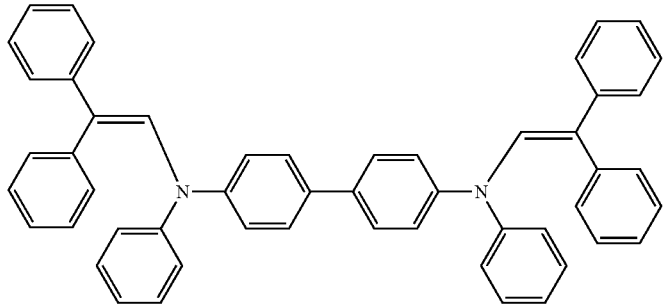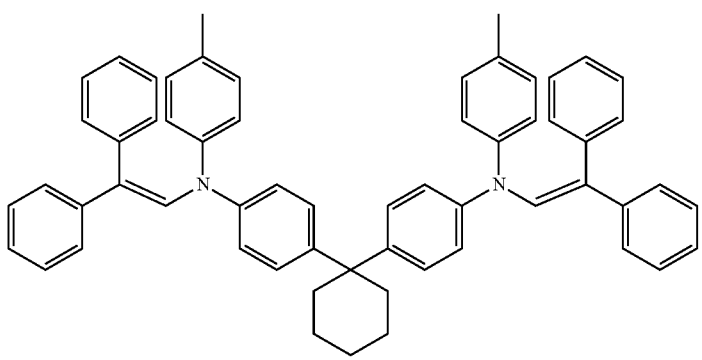

-continued
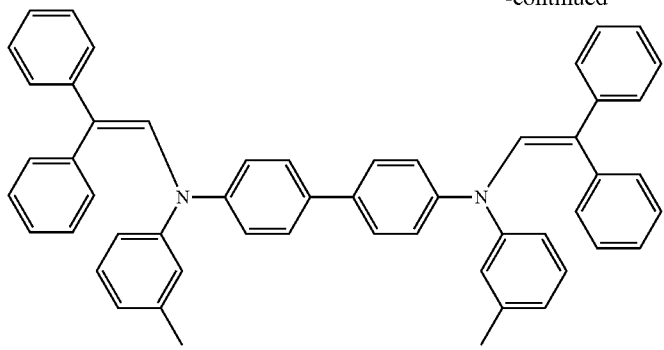
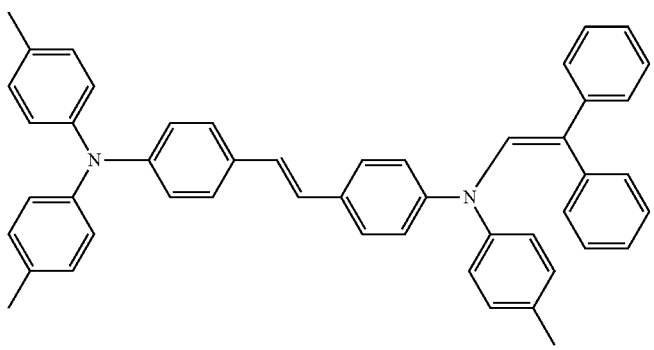
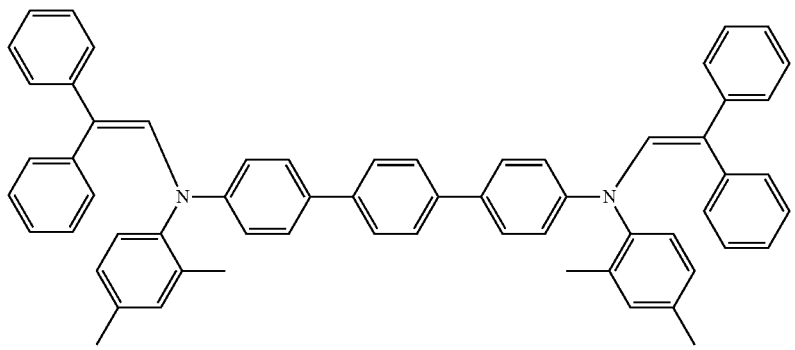
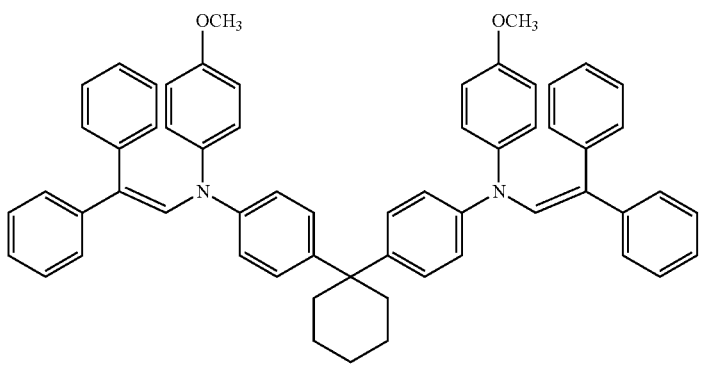

[Formula 21]
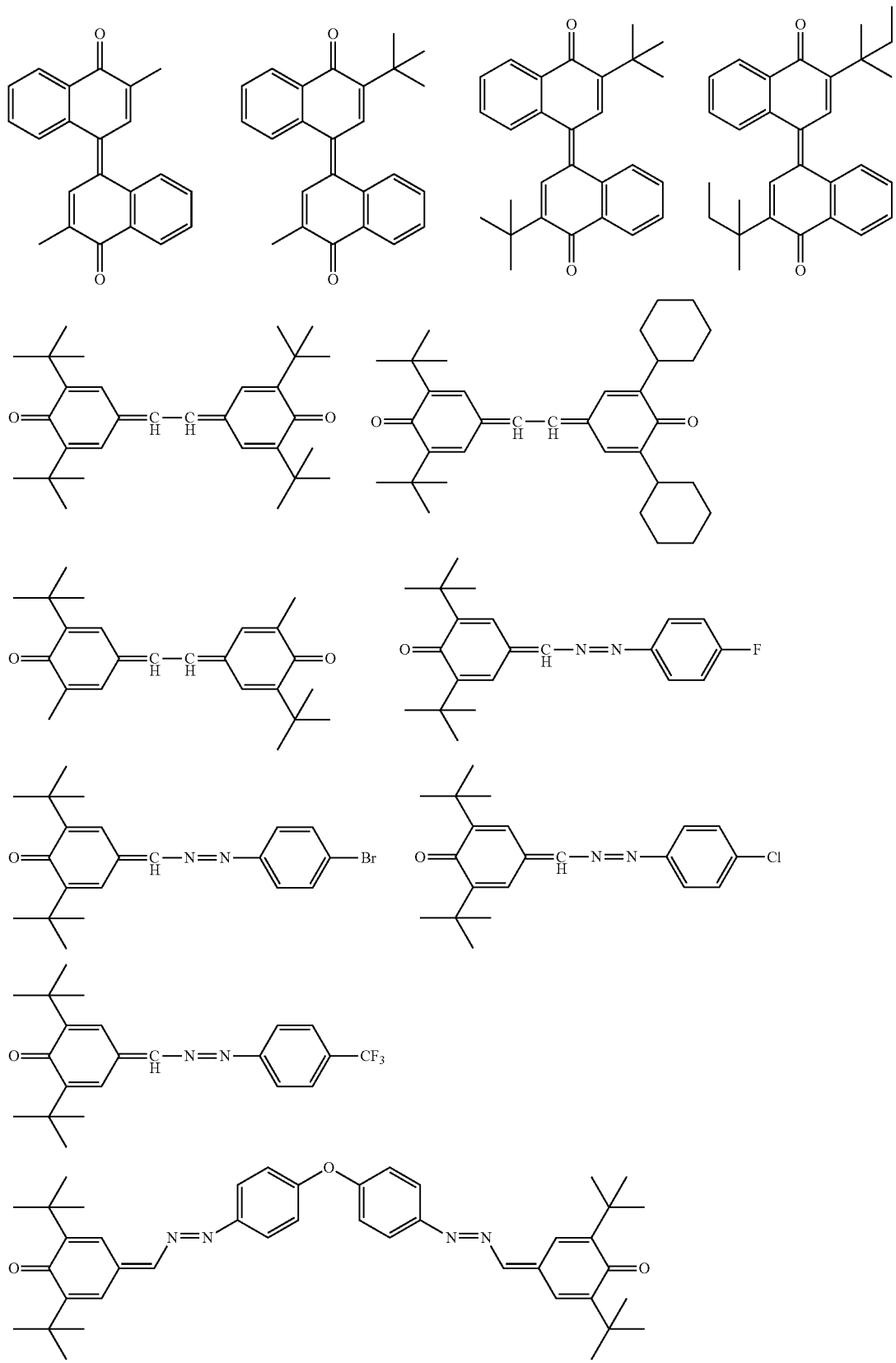

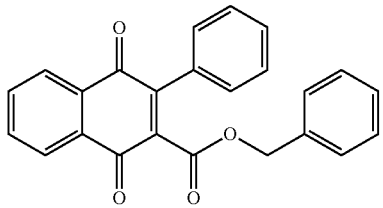

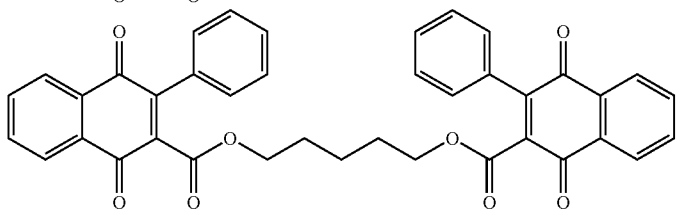

[Formula 22]

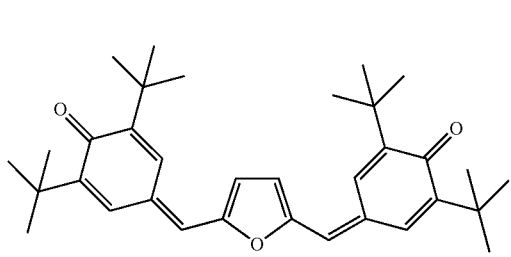
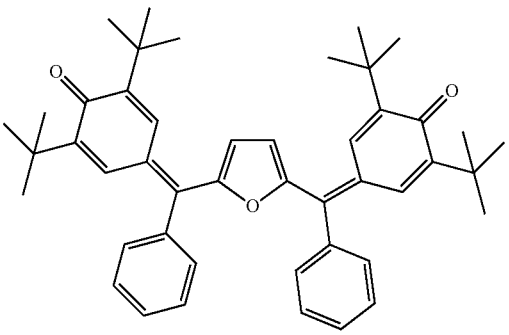

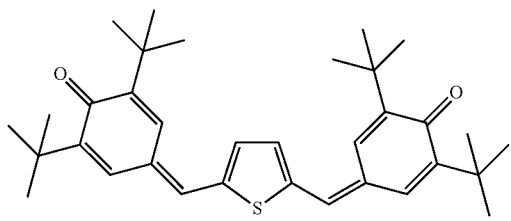
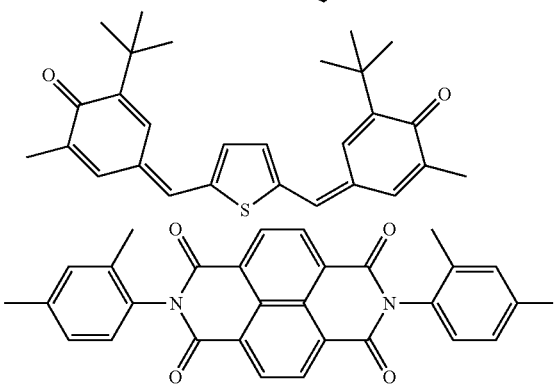

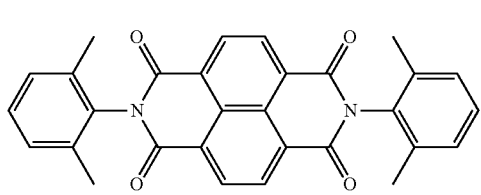
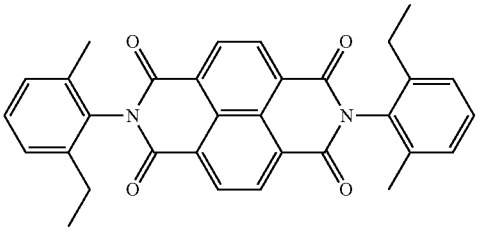

In the electrophotographic photoreceptor in the exemplary embodiment, the PC copolymer in the exemplary embodiment is preferably used as the binder resin in at least one of the charge generating layer and the charge transporting layer.

The electrophotographic photoreceptor in the exemplary embodiment may be provided with a typically-used undercoat layer between the conductive substrate and the photosensitive layer. Examples of the undercoat layer are particles such as titanium oxide, aluminum oxide, zirconia, titanic acid, zirconic acid, lanthanum lead, titanium black, silica, lead titanate, barium titanate, tin oxide, indium oxide and silicon oxide, and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the PC copolymer in the exemplary embodiment. One of the above particles and the resins may be used alone or a variety thereof may be mixed together in use. When a mixture thereof is used, a combination of inorganic particles and a resin is preferable because a flat and smooth film can be made.

The thickness of the undercoat layer is in a range of 0.01 μm to 10 μm, preferably of 0.1 μm to 7 μm. When the thickness of the undercoat layer is 0.01 μm or more, the undercoat layer can be formed even. Moreover, when the thickness is 10 μm or less, deterioration of the electrophotographic characteristics is inhibited.

The electrophotographic photoreceptor according to this exemplary embodiment may be provided with a typically-used known blocking layer between the conductive substrate and the photosensitive layer. The blocking layer may be made of the same resin as the binder resin. Alternatively, the blocking layer may be made of the PC copolymer in the exemplary embodiment. A thickness of the blocking layer is preferably in a range of 0.01 μm to 20 μm, more preferably of 0.1 μm to 10 μm. When the thickness of the blocking layer is 0.01 μm or more, the blocking layer can be formed even. Moreover, when the thickness is 20 μm or less, deterioration of the electrophotographic characteristics is inhibited.

The electrophotographic photoreceptor in the exemplary embodiment may be further provided with a protective layer laminated on the photosensitive layer. The protective layer may be made of the same resin as the binder resin. The PC copolymer in the exemplary embodiment is particularly preferably used for the protective layer. A thickness of the protective layer is preferably in a range of 0.01 μm to 20 μm, more preferably of 0.1 μm to 10 μm. The protective layer may contain a conductive material such as the charge generating substance, the charge transporting substance, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with a binder, a plasticizer, a curing catalyst, a fluidity adder, a pinhole controller and a spectral-sensitivity sensitizer (sensitizer dye). In addition, in order to prevent increase in residual potential after repeated use, reduction in charged potential and deterioration of sensitivity, various chemical substances and additives such as antioxidant, surfactant, curl inhibitor and leveling agent may be added.

Examples of the binders are silicone resin, polyamide resin, polyurethane resin, polyester resin, epoxy resin, polyketone resin, polycarbonate copolymer, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, at least one of a thermoset resin and a light-curable resin is also usable. The binder is not specifically limited to the above, as long as the binder is an electric-insulating resin from which a film is formable under normal conditions, and as long as an advantage of the invention is not hampered.

Examples of the plasticizer are biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst include methanesulfonic acid, dodecylbenzenesulfonic acid, and dinonylnaphthalene disulfonic acid. Examples of the fluidity adder include Modaflow® and Acronal 4F®. Examples of the pinhole controller are benzoin and dimethyl phthalate. The above plasticizer, curing catalyst, fluidity adder and pinhole controller are preferably contained at a content of 5 mass % or less of the charge transporting substance.

When a sensitizer dye is used as a spectral-sensitivity sensitizer, suitable examples of the sensitizer dye are triphenylmethane-base dye such as methyl violet, crystal violet, night blue and Victria blue, acridine dye such as erythrosine, Rhodamine B, Rhodamine 3R, acridine orange and frapeosine, thiazine dye such as methylene blue and methylene green, oxazine dye such as capri blue and meldra blue, cyanine dye, merocyanine dye, styryl dye, pyrylium salt dye and thiopyrylium salt dye.

In order to enhance the sensitivity, reduce the residual potential and reduce fatigue due to repeated use, the photosensitive layer may be added with an electron-accepting substance. Examples of the electron-accepting substance are preferably compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4-dinitrobenzophenone, 4-nitrobenzal malonodinitrile, α-cyano-β-(p-cyanophenyl)ethyl acrylate, 9-anthracenyl methylmalonodinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-(dicyanomethylene malononitrile), polynitro-9-fluorenylidene-(dicyanomethylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. An additive ratio of the compounds to be added is preferably 0.01 part by mass to 200 parts by mass per 100 parts by mass of the charge generating substance or the charge transporting substance, more preferably 0.1 part by mass to 50 parts by mass.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, or fluorine-base graft polymer may be used. An additive ratio of such surface modifiers is preferably 0.1 mass % to 60 mass % of the binder resin, more preferably 5 mass % to 40 mass %. When the additive ratio is less than 0.1 mass %, surface modification such as enhancement of surface durability and reduction in surface energy may not be sufficient. When the additive ratio is more than 60 mass %, the electrophotographic characteristics may be deteriorated.

Examples of the antioxidant are preferably a hindered phenol-base antioxidant, aromatic amine-base antioxidant, hindered amine-base antioxidant, sulfide-base antioxidant and organophosphate-base antioxidant. An additive ratio of the antioxidant is preferably 0.01 mass % to 10 mass % of the charge transporting substance, more preferably 0.1 mass % to 2 mass %.

Preferable examples of the antioxidant are compounds represented by chemical formulae disclosed in the Specification of JP-A-11-172003 ([Chemical Formula 94] to [Chemical Formula 101]).

One of the above antioxidants may be used alone, or two or more thereof may be mixed in use. In addition to the photosensitive layer, the above antioxidant may be added to the surface protecting layer, the undercoat layer and the blocking layer.

Examples of the solvent usable in forming the charge generating layer and the charge transporting layer are aromatic solvent such as benzene, toluene, xylene and chlorobenzene, ketone such as acetone, methyl ethyl ketone and cyclohexaneone, alcohol such as methanol, ethanol and isopropanol, ester such as acetic ether and ethyl cellosolve, halogenated hydrocarbon such as carbon tetrachloride, carbon tetrabromide, chloroform, dichloromethane and tetrachloroethane, ether such as tetrahydrofuran, dioxolane and dioxane, dimethylformamide, dimethylsulfoxide, and diethyl formamide. One of the above solvents may be used alone, or two or more thereof may be used together as a mixture solvent.

The photosensitive layer of a single-layer electrophotographic photoreceptor can be easily formed by applying the PC copolymer according to this exemplary embodiment as the binder resin with use of the charge generating substance, the charge transporting substance and the additive. The charge transporting substance is preferably added with at least one of the above-described hole transporting substance and an electron transporting substance. Electron transporting substances exemplified in JP-A-2005-139339 are preferably usable as the electron transporting substance.

Various coating applicators (e.g., known applicators) can perform application of each layer. Examples of such a coating applicator are an applicator, a spray coater, a bar coater, a chip coater, a roll coater, a dip coater and a doctor blade.

A thickness of the photosensitive layer of the electrophotographic photoreceptor is preferably in a range of 5 μm to 100 μm, more preferably of 8 μm to 50 μm. When the thickness of the photosensitive layer is 5 μm or more, decrease in an initial electric potential is prevented. When the thickness of the photosensitive layer is 100 μm or less, deterioration of electrophotographic characteristics is inhibited. A ratio of the charge generating substance to the binder resin used for manufacturing the electrophotographic photoreceptor is preferably 1:99 to 30:70 by mass, more preferably 3:97 to 15:85 by mass. Moreover, a ratio of the charge transporting substance to the binder resin is preferably 10:90 to 80:20 by mass, more preferably 30:70 to 70:30 by mass.

Since the electrophotographic photoreceptor thus obtained uses the PC copolymer in the exemplary embodiment, a coating agent is neither whitened nor gelled in manufacturing the photosensitive layer. Since the PC copolymer of the exemplary embodiment is contained as the binder resin in the photosensitive layer, the electrophotographic photoreceptor of the exemplary embodiment exhibits an excellent durability (i.e., wear resistance) and excellent electrical characteristics (i.e., electrification characteristics). Accordingly, the electrophotographic photoreceptor of the exemplary embodiment can maintain its excellent electrophotographic characteristics for a long time. Accordingly, the electrophotographic photoreceptor according to this exemplary embodiment is favorably applicable to various electrophotographic fields such as copier (black and white copier, multi-color copier, full-color copier; analog copier, digital copier), printer (laser printer, LED printer, liquid-crystal shutter printer), facsimile, platemaker and equipment capable of functioning as a plurality of them.

The electrophotographic photoreceptor according to this exemplary embodiment is electrified in use by corona discharge (corotron, scorotron), contact charging (charge roll, charge brush) or the like. Examples of the charge roll are a charge roll by DC electrification and a charge roll by AC and DC superimposed electrification. For exposure, a halogen lamp, a fluorescent lamp, laser (semiconductor, He—Ne), LED or a photoreceptor internal exposure system may be used. For image development, dry developing such as cascade developing, two-component magnetic brush developing, one-component insulating toner developing and one-component conductive toner developing, and wet developing may be used. For transfer, electrostatic transfer such as corona transfer, roller transfer and belt transfer, pressure transfer and adhesive transfer may be used. For fixing, heat roller fixing, radiant flash fixing, open fixing, pressure fixing and the like may be used. For cleaning and neutralizing, brush cleaner, magnetic brush cleaner, electrostatic brush cleaner, magnetic roller cleaner, and blade cleaner. It should be noted that cleaning and neutralizing may be performed without a cleaner. Examples of a resin for toner are styrene-base resin, styrene-acrylic base copolymer resin, polyester, epoxy resin and cyclic hydrocarbon polymer. The toner may be spherical or amorphous. The toner may also be controlled to have a certain shape (such as spheroidal shape and potato shape). The toner may be pulverized toner, suspension-polymerized toner, emulsion-polymerized toner, chemically-pelletized toner, or ester-elongation toner.

EXAMPLES

Next, the invention will be described in detail with reference to Examples and Comparatives. However, the invention is not limited to the examples but may include various modifications and applications as long as such modifications and applications do not depart from a technical idea of the invention.

Manufacturing Example

Preparation of Oligomer

Manufacturing Example 1

Synthesis of OC-BP Oligomer (Bischloroformate)

150.0 g (0.701 mol) of 3,3'-dimethyl-4,4'-biphenol (OC-BP) was suspended in 1100 mL of methylene chloride, to which 186 g (1.88 mol) of phosgene was added to be dissolved. Into this obtained solution, a solution in which 199.4 g (1.97 mol) of triethylamine was dissolved in 460 mL of methylene chloride was dropped at 13 degrees C. to 16 degrees C. for 2 hours and 50 minutes. The reactant mixture was stirred at 14 degrees C. to 16 degrees C. for 30 minutes. 5.0 mL of concentrated hydrochloric acid and 200 mL of deionized water were added to the reactant mixture for cleaning. Subsequently, cleaning with water was repeated until an aqueous layer becomes neutral. Thus, a methylene chloride solution of an OC-BP oligomer having a chloroformate group at its molecular end was obtained. The obtained solution had a chloroformate concentration of 0.58 mol/L, a solid concentration of 0.01 kg/L and an average number of monomer units of 1.06. This material obtained in Manufacturing Example 1 is referred to as "OCBP-CF" hereinafter.

The average number of monomer units (n) was obtained by the following numerical formula.

average number of monomer units($n$)=1+($Mav$−$M1$)/$M2$     (Numerical Formula 1)

In the numerical formula 1, Mav represents (2×1000/(CF value), M2 represents (M1−98.92), and M1 represents a molecular weight of the bischloroformate compound when n=1 in the formula (100). The CF value (N/kg) represents (CF value/concentration). The CF value (N) represents the number of chlorine molecule in the bischloroformate compound represented by the formula (100) contained in 1 L of the reaction solution. The concentration (kg/L) represents an amount of the solid content obtained by concentrating the 1-L reaction solution. Herein, 98.92 is a total atom weight of two chlorine atoms, one oxygen atom and one carbon atom which are desorbed at polycondensation of the bischloroformate oligomers.

Manufacturing Example 2

Synthesis of DMDPE Oligomer (Bischloroformate)

Into a mixed solution containing 160.0 g (0.695 mol) of bis(3-methyl-4-hydroxyphenyl)ether (DMDPE), 1020 mL of methylene chloride and 187 g (1.89 mol) of phosgene, a solution prepared by diluting 199.4 g (1.97 mol) of triethylamine in 460 mL of methylene chloride was dropped at 13 degrees C. to 16 degrees C. for 3 hours and 6 minutes. The reactant mixture was stirred at 14 degrees C. to 16 degrees C. for 1 hour and 38 minutes. 5.0 mL of concentrated hydrochloric acid and 200 mL of deionized water were added to the reactant mixture for cleaning. Subsequently, cleaning with water was repeated until an aqueous layer becomes neutral. Thus, a methylene chloride solution of a DMDPE oligomer having a chloroformate group at its molecular end was obtained.

The obtained solution had a chloroformate concentration of 1.04 mol/L, a solid concentration of 0.18 kg/L and an average number of monomer units of 1.07. This material obtained in Manufacturing Example 2 is referred to as "DMDPE-CF" hereinafter.

Manufacturing Example 3

Synthesis of DE-BP Oligomer (Bischloroformate)

150.0 g (0.620 mol) of 3,3'-diethyl-4,4'-biphenol (DE-BP) was suspended in 1100 mL of methylene chloride, to which 186 g (1.88 mol) of phosgene was added to be dissolved. Into this obtained solution, a solution in which 199.4 g (1.97 mol) of triethylamine was dissolved in 460 mL of methylene chloride was dropped at 13 degrees C. to 16 degrees C. for 2 hours and 50 minutes. The reactant mixture was stirred at 14 degrees C. to 16 degrees C. for 30 minutes. 5.0 mL of concentrated hydrochloric acid and 200 mL of deionized water were added to the reactant mixture for cleaning. Subsequently, cleaning with water was repeated until an aqueous layer becomes neutral. Thus, a methylene chloride solution of an DE-BP oligomer having a chloroformate group at its molecular end was obtained. The obtained solution had a chloroformate concentration of 0.57 mol/L, a solid concentration of 0.01 kg/L and an average number of monomer units of 1.06. This material obtained in Manufacturing Example 3 is referred to as "DEBP-CF" hereinafter.

Manufacturing Example 4

Synthesis of BisZ Oligomer (Bischloroformate)

56.6 kg (224 mol) of 1,1-bis(4-hydroxyphenyl)cyclohexane (bisphenol Z) was suspended in 1080 L of methylene chloride, to which 66.0 kg (667 mol) of phosgene was added for dissolution. Into this obtained solution, a solution in which 44.0 kg (435 mol) of triethylamine was dissolved in 120 L of methylene chloride was dropped at 2.2 degrees C. to 17.8 degrees C. for 2 hours and 50 minutes. After the solution was stirred at 17.9 degrees C. to 19.6 degrees C. for 30 minutes, 900 L of methylene chloride was distilled away at 14 degrees C. to 22 degrees C. 210 L of deionized water, 1.2 kg of concentrated hydrochloric acid and 450 g of hydrosulphite were added to the residual solution for cleaning. Subsequently, cleaning with 210 L of deionized water was repeated five times. A methylene chloride solution of a bisphenol Z oligomer having a chloroformate group at its molecular end was obtained.

The obtained solution had a chloroformate concentration of 1.14 mol/L, a solid concentration of 0.22 kg/L and an average number of monomer units of 1.02. This material obtained in Manufacturing Example 4 is referred to as "Z-CF" hereinafter.

Example 1

Manufacturing of PC Copolymer

OCBP-CF (47.9 mL) of Manufacturing Example 1 and methylene chloride (20 mL) were put into a reactor provided with a mechanical stirrer, stirring vane and baffle plate. To the obtained solution, p-tert-butylphenol (hereinafter occasionally referred to as PTBP) (0.054 g) as a terminal terminator was added and stirred for sufficient mixing. After a temperature inside the reactor was cooled down to 15 degrees C., an entire amount of the prepared 2,2-bis(4-hydroxyphenyl)butane solution was added to the obtained solution, to which 0.2 mL of a triethylamine aqueous solution (7 vol %) was added with stirring and kept on stirring for one hour.

The obtained reactant mixture was diluted with 0.15 L of methylene chloride and 0.01 L of water and cleaned. A lower layer was separated from the reactant mixture. Then, the reactant mixture was cleaned with 0.12 L of water one time, with 0.1 L of 0.03N hydrochloric acid one time, and with 0.12 L of water three times in this order. The obtained methylene chloride solution was dropped into methanol with stirring. The obtained deposit was filtered and dried to prepare a PC copolymer (PC-1) with the following structure.

The 2,2-bis(4-hydroxyphenyl)butane solution in Example 1 was separately prepared by: preparing 23 mL of 2.2N potassium hydroxide aqueous solution (3.3 g of potassium hydroxide); cooling the solution to the room temperature or less; adding 0.1 g of hydrosulphite as an antioxidant and 3.36 g of 2.2-bis(4-hydroxyphenyl)butane; and completely dissolving the added compounds in the solution.

Identification of PC Copolymer

The PC copolymer (PC-1) obtained in Example 1 was dissolved in methylene chloride to prepare a solution having a concentration of 0.5 g/dL. When a reduced viscosity [$\eta_{sp}$/C] thereof at 20 degrees C. was measured, the result was 1.17 dl/g. A structure and a composition of the obtained PC copolymer (PC-1) were analyzed by $^1$H-NMR spectrum method and $^{13}$C-NMR spectrum method. The obtained PC-1 was identified as a PC copolymer having a repeating unit represented by the formula (8) below, the number of the repeating unit and a composition as follows.

[Formula 23]

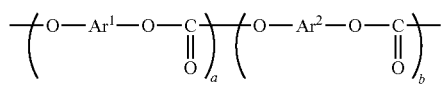
(8)

[Formula 24]

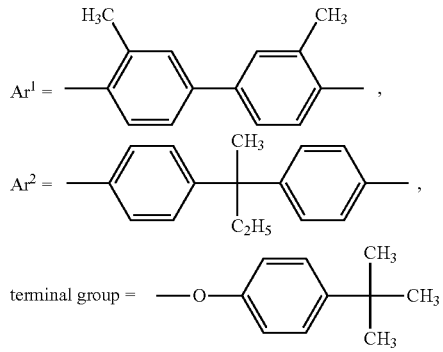

a = 0.60 b = 0.40

A structure of the PC copolymer in the formula (8) was identified according to the following procedure. Firstly, the structure of the PC copolymer in the formula (8) was analyzed for identification by the $^1$H-NMR spectrum method and $^{13}$C-NMR spectrum method. Molar copolymerization ratios a and b of the respective Ar$^1$ skeleton unit and Ar$^2$ skeleton unit were calculated from the integral intensity.

Manufacturing of Coating Liquid and Electrophotographic Photoreceptor

A film of polyethylene terephthalate resin on which aluminum metal was deposited was used as a conductive substrate. A charge generating layer and a charge transporting layer were sequentially laminated on the surface of the conductive substrate to form a laminated sensitive layer, thereby providing an electrophotographic photoreceptor formed with the laminated sensitive layer. 0.5 part by mass of oxotitanium phthalocyanine was used as a charge generating substance while 0.5 part by mass of a butyral resin was used as a binder resin. The charge generating substance and the binder resin were added into 19 parts by mass of methylene chloride (solvent) and dispersed with a ball mill. Then, the dispersion was applied onto the surface of the conductive-substrate film and dried, thereby providing a charge generating layer having a film thickness of approximately 0.5 μm.

Next, for use as a charge transporting substance, 0.4 g of a compound (CTM-1) represented by a formula (23) below and 0.6 g of the PC copolymer (PC-1) obtained as described above were dispersed in 10 mL of tetrahydrofuran to prepare a coating liquid. The coating liquid was applied onto the charge generating layer with an applicator and dried, thereby providing a charge transporting layer having a film thickness of approximately 20 μm.

[Formula 25]

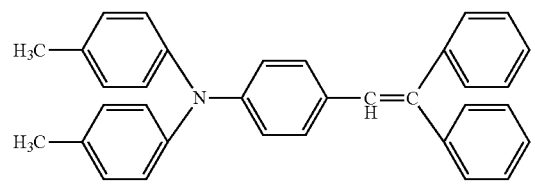
(23)

Evaluation of PC Copolymer and Electrophotographic Photoreceptor

Solubility of the PC copolymer was evaluated by visually checking whitening degree of the prepared coating liquid when the coating liquid was prepared. A case where the PC copolymer was dissolved to show no whitening was marked as A, a case where the PC copolymer was partially undissolved was marked as B, and a case where the PC copolymer was whitened was marked as C.

Wear resistance of the PC copolymer and the electrophotographic photoreceptor was evaluated as follows.

Sample Preparation (1-1) Sample preparation for evaluation on wear resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

(1-2) Sample preparation for evaluation on wear resistance of the photoreceptor: PC-1 (1 g) and CTM-1 (0.67 g) were dissolved in methylene chloride (10 mL) and the obtained solution was cast into film on a commercially available PET film using an applicator. This film was heated under reduced pressure and a solvent was removed to obtain a film sample having a thickness of about 30 μm.

Evaluation

Wear resistance of cast surfaces of the films manufactured in the above processes (1-1) and (1-2) was evaluated using a taber abrasion tester (manufactured by Toyo Seiki Seisaku-Sho, Ltd.). Testing conditions: an abrasion ring (model No.: CS-10) to which 500 g of load was applied was brought into contact with each of the film surfaces. A decrease in mass of each of the sample films was measured after 1,000 rotations for the sample film in the process (1-1) and after 500 rotations for the sample film in the process (1-2).

At the same time, plasma resistance, which is an index of the electrical strength of the PC copolymer and the electrophotographic photoreceptor, was evaluated as follows.

Sample Preparation (2-1) Sample preparation for evaluation on plasma resistance of the copolymer: PC-1 (2 g) was dissolved in methylene chloride (12 mL) and the obtained solution was cast into film on a commercially available PET film using an applicator. This film was heated under reduced pressure and a solvent was removed to obtain a film sample having a thickness of about 30 μm.

(2-2) Sample preparation for evaluation on plasma resistance of the photoreceptor: PC-1 (1 g) and CTM-1 (0.67 g) were dissolved in methylene chloride (10 mL) and the obtained solution was cast into film on a commercially available PET film using an applicator. This film was heated under reduced pressure and a solvent was removed to obtain a film sample having a thickness of about 30 μm.

Evaluation

After surfaces of the sample films manufactured in the above processes (2-1) and (2-2) were treated using a corona surface treater AGI-0205 manufactured by KASUGA ELECTRIC WORKS. LTD, a contact angle with water was measured. A difference in a contact angle between before and after electrical discharge was obtained as a change amount Δ and defined as an evaluation index on plasma resistance. The test was conducted under conditions of an electrical discharge amount being 58 W·min/m².

Next, electrophotographic characteristics of the obtained electrophotographic photoreceptor were measured using an electrostatic charge tester EPA-8100 (manufactured by Kawaguchi Electric Works Co., Ltd.). Specifically, corona discharge of −6 kV was caused to occur in the static mode. Then, an initial surface potential ($V_0$), a residual potential (initial residual potential ($V_R$)) after five seconds of light irradiation (10 Lux) and a half-life exposure amount ($E_{1/2}$) were measured. Moreover, a commercially available printer (FS-600, manufactured by Kyocera Corporation) was modified, which enabled to measure the surface potential of the photoreceptor. Then, the photoreceptor was mounted on a drum and evaluated in terms of electrification characteristics (repeating residual-potential increase ($V_R$ increase) before and after 24-hour-consecutive operation under conditions of high temperature and high humidity (35 degrees C., 85%) not through a toner and a paper.

The results are shown in Table 1. The later-described Examples 2 to 3 and Comparative 1 were evaluated in the same manner. The results are also shown in Table 1.

Example 2

DMDPE-CF (256 mL) of Manufacturing Example 2 and methylene chloride (383 mL) were put into a reactor provided with a mechanical stirrer, stirring vane and baffle plate. To this solution, p-tert-butylphenol (PTBP) (0.389 g) was added as a terminal terminator and stirred for sufficient mixing. After a temperature inside the reactor was cooled down to 15 degrees C., an entire amount of the prepared divalent phenol solution was added to the obtained solution, to which 2.0 mL of a triethylamine aqueous solution (7 vol %) was added with stirring and kept on stirring for one hour.

The obtained reactant mixture was diluted with 0.80 L of methylene chloride and 0.22 L of water and cleaned. A lower layer was separated from the reactant mixture. Then, the reactant mixture was cleaned with 0.26 L of water one time, with 0.1 L of 0.03N hydrochloric acid one time, and with 0.26 L of water three times in this order. The obtained methylene chloride solution was dropped into methanol with stirring. The obtained deposit was filtered and dried to prepare a PC copolymer (PC-2) with the following structure.

The divalent phenol solution in Example 2 was separately prepared by: preparing 215 mL of 2.2N sodium hydroxide aqueous solution (31.5 g of sodium hydroxide); cooling the solution to the room temperature or less; adding 0.2 g of hydrosulphite as an antioxidant, 28.97 g of 2,2-bis(4-hydroxyphenyl)butane, and 3.05 g of bis(4-hydroxyphenyl) ether in the solution; and completely dissolving the added compounds in the solution.

The PC copolymer (PC-2) was identified as a PC copolymer having 1.22 dL/g of a reduced viscosity [ηsp/C] and a structure with the following repeating unit and composition in the formula (8).

[Formula 26]

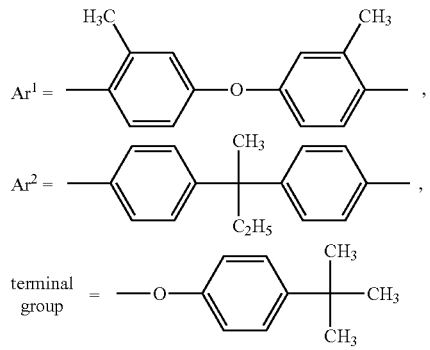

a = 0.58 b = 0.42

Example 3

Z-CF (47.9 mL) of Manufacturing Example 4 and methylene chloride (200 mL) were put into a reactor provided with a mechanical stirrer, stirring vane and baffle plate. To the obtained solution, fluorinated diethylene glycol monohexyl ether (hereinafter occasionally referred to as "modified F15") (1.480 g) as a terminal terminator was added and stirred for sufficient mixing. After a temperature inside the reactor was cooled down to 15 degrees C., an entire amount of the prepared divalent phenol solution was added to the obtained solution, to which 0.2 mL of a triethylamine aqueous solution (7 vol %) was added with stirring and kept on stirring for one hour.

The obtained reactant mixture was diluted with 1.3 L of methylene chloride and 0.1 L of water and cleaned. A lower layer was separated from the reactant mixture. Then, the reactant mixture was cleaned with 0.34 L of water one time, with 0.1 L of 0.03N hydrochloric acid one time, and with 0.34 L of water three times in this order. The obtained methylene chloride solution was dropped into methanol with stirring. The obtained deposit was filtered and dried to prepare a PC copolymer (PC-3) with the following structure.

The divalent phenol solution in Example 3 was separately prepared by: preparing 230 mL of 2.2N potassium hydroxide aqueous solution (32.6 g of potassium hydroxide); cooling the solution to the room temperature or less; adding 0.25 g of hydrosulphite as an antioxidant, 30.85 g of 1,1-bis(4-hydroxyphenyl)cyclohexane, and 5.10 g of 3,3'-dimethyl-4,4'-biphenol; and completely dissolving the added compounds in the solution.

The PC copolymer (PC-3) was identified as a PC copolymer having 1.23 dL/g of a reduced viscosity [ηsp/C] and a structure with the following repeating unit and composition in the formula (8).

[Formula 27]

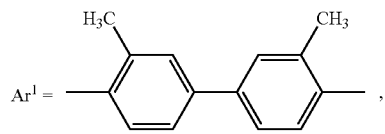

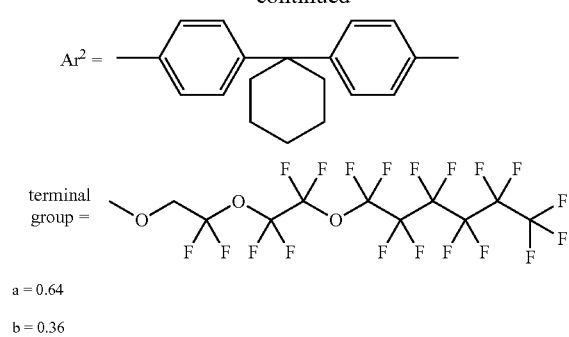

a = 0.64 b = 0.36

Example 4

DMDPE-CF (256 mL) of Manufacturing Example 2 and methylene chloride (383 mL) were put into a reactor provided with a mechanical stirrer, stirring vane and baffle plate. To this solution, p-tert-butylphenol (PTBP) (0.389 g) was added as a terminal terminator and stirred for sufficient mixing. After a temperature inside the reactor was cooled down to 15 degrees C., an entire amount of the prepared divalent phenol solution was added to the obtained solution, to which 2.0 mL of a triethylamine aqueous solution (7 vol %) was added with stirring and kept on stirring for one hour.

The obtained reactant mixture was diluted with 0.80 L of methylene chloride and 0.22 L of water and cleaned. A lower layer was separated from the reactant mixture. Then, the reactant mixture was cleaned with 0.26 L of water one time, with 0.1 L of 0.03N hydrochloric acid one time, and with 0.26 L of water three times in this order. The obtained methylene chloride solution was dropped into methanol with stirring. The obtained deposit was filtered and dried to prepare a PC copolymer (PC-4) with the following structure.

The divalent phenol solution in Example 4 was separately prepared by: preparing 215 mL of 2.2N sodium hydroxide aqueous solution (31.5 g of sodium hydroxide); cooling the solution to the room temperature or less; adding 0.2 g of hydrosulphite as an antioxidant, and 35.95 g of 2,2-bis(3-methyl-4-hydroxyphenyl)butane; and completely dissolving the added compounds in the solution.

The PC copolymer (PC-4) was identified as a PC copolymer having 1.17 dL/g of a reduced viscosity [ηsp/C] and a structure with the following repeating unit and composition in the formula (8).

[Formula 28]

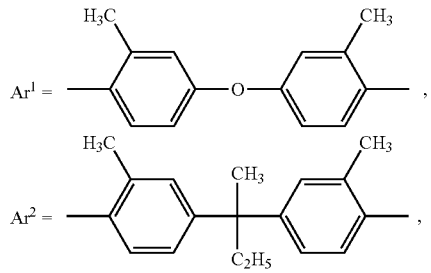

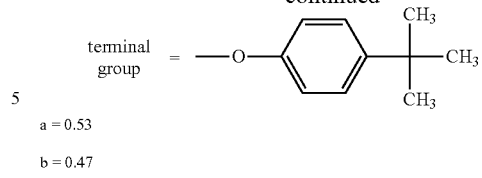

a = 0.53 b = 0.47

Example 5

OCBP-CF (47.9 mL) of Manufacturing Example 1 and methylene chloride (20 mL) were put into a reactor provided with a mechanical stirrer, stirring vane and baffle plate. To this solution, p-tert-butylphenol (PTBP) (0.054 g) was added as a terminal terminator and stirred for sufficient mixing. After a temperature inside the reactor was cooled down to 15 degrees C., an entire amount of the prepared 1,1-bis(4-hydroxyphenyl)ethane solution was added to the obtained solution, to which 0.2 mL of a triethylamine aqueous solution (7 vol %) was added with stirring and kept on stirring for one hour.

The obtained reactant mixture was diluted with 0.15 L of methylene chloride and 0.01 L of PTBP water and cleaned. A lower layer was separated from the reactant mixture. Then, the reactant mixture was cleaned with 0.12 L of water one time, with 0.1 L of 0.03N hydrochloric acid one time, and with 0.12 L of water three times in this order. The obtained methylene chloride solution was dropped into methanol with stirring. The obtained deposit was filtered and dried to prepare a PC copolymer (PC-5) with the following structure.

The 1,1-bis(4-hydroxyphenyl)ethane solution was separately prepared by: preparing 23 mL of 2.2N potassium hydroxide aqueous solution (3.25 g of potassium hydroxide); cooling the solution to the room temperature or less; adding 0.1 g of hydrosulphite as an antioxidant and 2.97 g of 1,1-bis(4-hydroxyphenyl)ethane; and completely dissolving the added compounds in the solution.

The PC copolymer (PC-5) was identified as a PC copolymer having 1.20 dL/g of a reduced viscosity [ηsp/C] and a structure with the following repeating unit and composition in the formula (8).

[Formula 29]

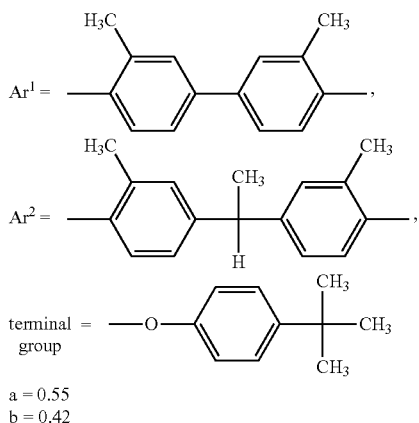

a = 0.55 b = 0.42

Example 6

In Example 6, a PC copolymer (PC-6) with the following structure was manufactured in the same manner as in Example 3 except that fluorinated diethylene glycol monohexyl ether (1.480 g) (the terminal terminator) was replaced by 2,2-difluoro-2-(1,1,2,2-tetrafluoro-2-(1,1,2,3,3,3-hexafluoro-2-(trifluoromethyl)propoxy)ethoxy)ethanol (1.09 g).

The PC copolymer (PC-6) was identified as a PC copolymer having 1.22 dL/g of a reduced viscosity [ηsp/C] and a structure with the following repeating unit and composition in the formula (8).

[Formula 30]

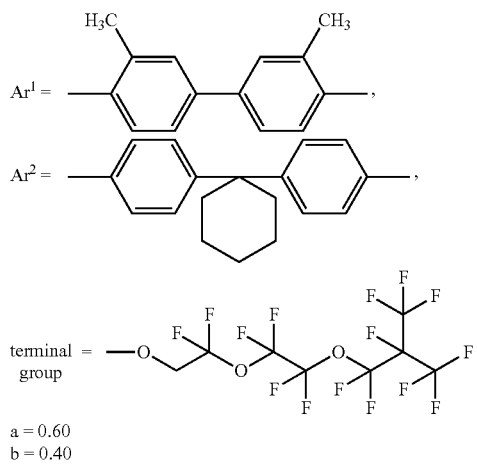

a = 0.60
b = 0.40

Example 7

DEBP-CF (478.6 mL) of Manufacturing Example 3 and methylene chloride (198 mL) were put into a reactor provided with a mechanical stirrer, stirring vane and baffle plate. To this solution, p-tert-butylphenol (PTBP) (0.411 g) was added as a terminal terminator and stirred for sufficient mixing. After a temperature inside the reactor was cooled down to 15 degrees C., an entire amount of the prepared divalent phenol solution was added to the obtained solution, to which 2.0 mL of a triethylamine aqueous solution (7 vol %) was added with stirring and kept on stirring for one hour.

The obtained reactant mixture was diluted with 0.80 L of methylene chloride and 0.22 L of water and cleaned. A lower layer was separated from the reactant mixture. Then, the reactant mixture was cleaned with 0.26 L of water one time, with 0.1 L of 0.03N hydrochloric acid one time, and with 0.26 L of water three times in this order. The obtained methylene chloride solution was dropped into methanol with stirring. The obtained redeposit was filtered and dried to prepare a PC copolymer (PC-7) with the following structure.

The divalent phenol solution in Example 7 was separately prepared by: preparing 228 mL of 2.2N potassium hydroxide aqueous solution (32.0 g of potassium hydroxide); cooling the solution to the room temperature or less; adding 0.2 g of hydrosulphite as an antioxidant, 32.75 g of 1,1-bis(4-hydroxyphenyl)cyclohexane, and 3.50 g of 3,3'-diethyl-4,4'-biphenol; and completely dissolving the added compounds in the solution.

The PC copolymer (PC-7) was identified as a PC copolymer having 1.18 dL/g of a reduced viscosity [ηsp/C] and a structure with the following repeating unit and composition in the formula (8).

[Formula 31]

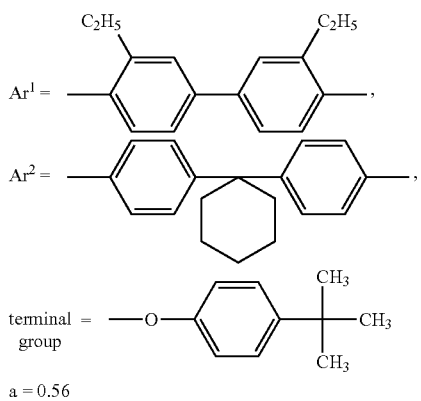

a = 0.56
b = 0.44

Comparative 1

Z-CF (157 mL) of Manufacturing Example 4 and methylene chloride (227 mL) were put into a reactor provided with a mechanical stirrer, stirring vane and baffle plate. To this solution, PTBP (0.336 g) was added as a terminal terminator and stirred for sufficient mixing. After a temperature inside the reactor was cooled down to 15 degrees C., an entire amount of the prepared divalent phenol solution was added to the obtained solution, to which 2.0 mL of a triethylamine aqueous solution (7 vol %) was added with stirring and kept on stirring for one hour.

The obtained reactant mixture was diluted with 0.2 L of methylene chloride and 0.1 L of water and cleaned. A lower layer was separated from the reactant mixture. Then, the reactant mixture was cleaned with 0.1 L of water one time, with 0.1 L of 0.03N hydrochloric acid one time, and with 0.1 L of water three times in this order. The obtained methylene chloride solution was dropped into methanol with stirring. The obtained deposit was filtered and dried to prepare a PC copolymer (PC-8) with the following structure.

The divalent phenol solution in Comparative 1 was separately prepared by: preparing 135 mL of 1.5N sodium hydroxide aqueous solution (11.1 g of sodium hydroxide); cooling the solution to the room temperature or less; adding 0.25 g of hydrosulphite as an antioxidant, and 7.6 g of 4,4'-biphenol; and completely dissolving the added compounds in the solution.

The PC copolymer (PC-8) was identified as a PC copolymer having 1.18 dL/g of a reduced viscosity [ηsp/C] and a structure with the following repeating unit and composition in the formula (8).

[Formula 32]

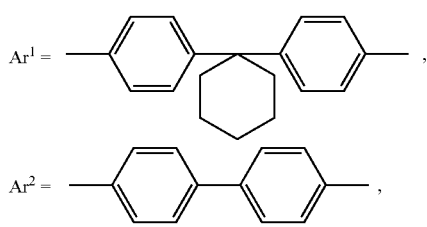

-continued

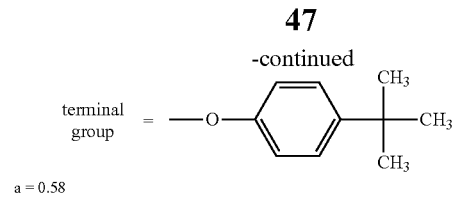

a = 0.58 b = 0.42

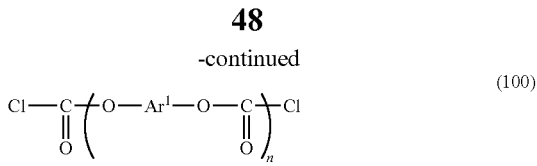

in the formulae (1) and (100), $Ar^1$ represents a group represented by a formula (3) below;

TABLE 1

| | Reduced Viscosity (dl/g) | PC Copolymer Wear Resistance (mg) | Contact Angle Change AmountΔ (before/after electrical discharge) | Solubility | Electrophotographic Photoreceptor Wear Resistance (mg) | Contact Angle Change AmountΔ (before/after electrical discharge) | Initial Residual Potential ($V_R$) | Repeating Residual Potential ($V_R$ increase) |
|---|---|---|---|---|---|---|---|---|
| Example 1 (PC-1) | 1.17 | 3.6 | 49.5 | A | 6.5 | 50.4 | −10 | 10 |
| Example 2 (PC-2) | 1.22 | 3.8 | 48.4 | A | 6.6 | 49.6 | −10 | 10 |
| Example 3 (PC-3) | 1.23 | 3.5 | 46.5 | A | 6.3 | 47.5 | −10 | 10 |
| Example 4 (PC-4) | 1.17 | 3.7 | 46.5 | A | 6.5 | 46.8 | −10 | 10 |
| Example 5 (PC-5) | 1.20 | 3.6 | 48.4 | A | 6.4 | 49.6 | −10 | 10 |
| Example 6 (PC-6) | 1.23 | 3.4 | 45.5 | A | 6.2 | 46.5 | −10 | 10 |
| Example 7 (PC-7) | 1.18 | 3.5 | 43.3 | A | 6.3 | 44.7 | −10 | 10 |
| Comparative 1 (PC-8) | 1.18 | 5.9 | 62.0 | A | 7.2 | 59.8 | −10 | 10 |

Evaluation Results

Table 1 shows evaluation results of Examples 1 to 7 and Comparative 1. In comparison between Examples 1 to 7 and Comparative 1, the PC copolymers in Examples 1 to 7 were observed to have an extremely favorable wear resistance and a small contact angle change amount Δ caused by electrical discharge, thus being unlikely to cause electrification deterioration. In contrast, the copolymer in Comparative 1 was observed to have a large contact angle change amount Δ caused by electrical discharge, thus being likely to cause electrification deterioration, although having a sufficient wear resistance.

The invention claimed is:

1. A polycarbonate copolymer comprising:
a repeating unit represented by a formula (1) below; and
a repeating unit represented by a formula (2) below, wherein
the repeating unit represented by the formula (1) is formed from a bischloroformate oligomer having an average number of monomer units n represented by a formula (100) below in a range from 1.0 to 1.3,

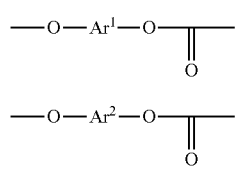

in the formula (2), $Ar^2$ represents a divalent aromatic group,

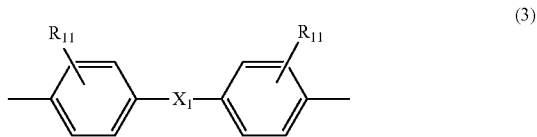

where: $X_1$ represents a single bond or an oxygen atom; and $R_{11}$ each independently represents a methyl group or an ethyl group, and wherein the chain end of the polycarbonate copolymer is terminated by a monovalent terminal terminator selected from any one of the fluorine-containing alcohols below,

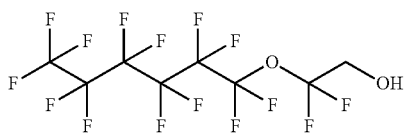

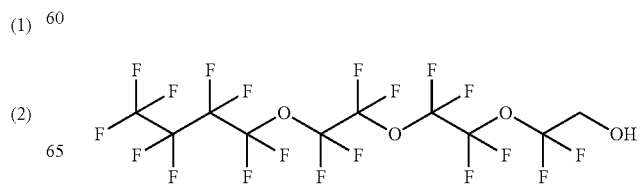

-continued

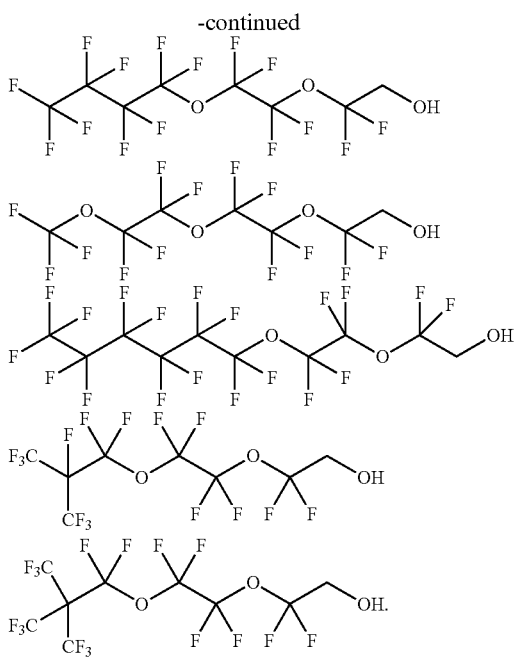

2. The polycarbonate copolymer according to claim 1, wherein provided that a mole percentage of total repeating units of the repeating unit represented by the formula (1) and the repeating unit represented by the formula (2) is defined as 100 mol %, a mole percentage of the repeating unit represented by the formula (1) is in a range from 52 mol % to 72 mol %, and a mole percentage of the repeating unit represented by the formula (2) is in a range from 28 mol % to 48 mol %, and provided that total triads contained in a chain of the repeating units is defined as 100 mol %, a mole percentage of a triad that is three repeating units represented by the formula (1) in a row is 5 mol % or less, and $Ar^2$ is a group represented by a formula (4) below,

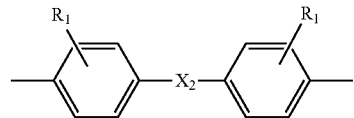

(4)

where: $X_2$ represents an oxygen atom or $CR^3R^4$;
$R^1$ represents a hydrogen atom or a methyl group;
$R^3$ and $R^4$ each independently represent a hydrogen atom or an alkyl group having 1 to 3 carbon atoms, or $R^3$ and $R^4$ form a ring to provide a substituted or unsubstituted cycloalkyl group having 5 to 6 ring carbon atoms; and
$R^3$ and $R^4$ are optionally the same group or different groups.

3. The polycarbonate copolymer according to claim 1, wherein
$Ar^1$ in the formula (1) is a divalent group derived from a compound selected from the group consisting of 3,3'-dimethyl-4,4'-biphenol and bis(3-methyl-4-hydroxyphenyl)ether.

4. The polycarbonate copolymer according to claim 1, wherein
$Ar^2$ in the formula (2) is a divalent group derived from a compound selected from the group consisting of bis(4-hydroxyphenyl)ether, 2,2-bis(4-hydroxyphenyl)butane and 1,1-bis(4-hydroxyphenyl)cyclohexane.

5. A coating liquid comprising: the polycarbonate copolymer according to claim 1; and an organic solvent.

6. A molding comprising the polycarbonate copolymer according to claim 1.

7. An electrophotographic photoreceptor comprising:
a conductive substrate; and
a photosensitive layer provided on the conductive substrate,
the photosensitive layer comprising the polycarbonate copolymer according to claim 1 as a component.

* * * * *